US012671535B2

(12) United States Patent (10) Patent No.: US 12,671,535 B2
Muruganathan et al. (45) Date of Patent: Jun. 30, 2026

(54) RECEIVING TIME OVERLAPPING DOWNLINK REFERENCE SIGNALS AND CHANNELS

(71) Applicant: Telefonaktiebolaget LM Ericsson (publ), Stockholm (SE)

(72) Inventors: Siva Muruganathan, Stittsville (CA); Shiwei Gao, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 797 days.

(21) Appl. No.: 17/917,574

(22) PCT Filed: Apr. 12, 2021

(86) PCT No.: PCT/IB2021/053016
§ 371 (c)(1),
(2) Date: Oct. 7, 2022

(87) PCT Pub. No.: WO2021/205417
PCT Pub. Date: Oct. 14, 2021

(65) Prior Publication Data
US 2023/0179354 A1     Jun. 8, 2023

Related U.S. Application Data

(60) Provisional application No. 63/008,386, filed on Apr. 10, 2020.

(51) Int. Cl.
*H04W 72/02* (2009.01)
*H04L 5/00* (2006.01)
(52) U.S. Cl.
CPC .......... *H04L 5/0048* (2013.01); *H04L 5/0023* (2013.01); *H04L 5/0091* (2013.01)

(58) Field of Classification Search
CPC . H04W 72/02; H04W 72/04; H04W 72/0446; H04W 72/121; H04W 72/23;
(Continued)

(56) References Cited

U.S. PATENT DOCUMENTS

2019/0229792 A1     7/2019   John Wilson et al.
2019/0342907 A1     11/2019   Huang et al.
(Continued)

FOREIGN PATENT DOCUMENTS

WO     2019099659 A1     5/2019

OTHER PUBLICATIONS

Author Unknown, "Technical Specification Group Radio Access Network; NR; Physical layer procedures for data (Release 16)," Technical Specification 38.214, Version 16.0.0, Dec. 2019, 3GPP Organizational Partners, pp. 10-12, 54-55 (excerpt).
(Continued)

*Primary Examiner* — Bo Hui A Zhu
(74) *Attorney, Agent, or Firm* — Withrow & Terranova, PLLC

(57)     ABSTRACT

Systems and methods for determining Transmission Configuration Indication (TCI) states for Aperiodic (AP) Channel State Information Reference Signals (CSI-RSs) overlapping with downlink transmissions are provided. In some embodiments, a method performed by a wireless device includes: receiving AP CSI-RSs in the same symbols as downlink transmissions scheduled by a DCI with two TCI states indicated in DCI; receiving triggering of the one or more AP CSI-RS with scheduling offset between the last symbol of the PDCCH carrying the triggering DCI and the first symbol of the AP CSI-RS resources, where the scheduling offset is smaller than a wireless device reported threshold; and determining that the downlink transmission is scheduled according to a scheme where different sets of
(Continued)

layers of the downlink transmission are received with different TCI states. In some embodiments, the wireless device applies a QCL assumption for a PDSCH transmission occasion when receiving the AP CSI-RS.

21 Claims, 26 Drawing Sheets

(58) Field of Classification Search
CPC ..... H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

| | | | |
|---|---|---|---|
| 2020/0077395 A1 | 3/2020 | Guo | |
| 2021/0337584 A1* | 10/2021 | Zhang | H04W 72/23 |
| 2022/0191081 A1* | 6/2022 | Kim | H04B 1/7156 |
| 2022/0210812 A1* | 6/2022 | Matsumura | H04W 72/23 |

OTHER PUBLICATIONS

ZTE, "R1-2000239: Maintenance of enhancements on multi-TRP transmission," 3GPP TSG RAN WG1 Meeting #100-e, Feb. 24-Mar. 6, 2020, Electronic Meeting, 17 pages.

Notice of Reasons for Rejection for Japanese Patent Application No. 2022-561662, mailed Oct. 24, 2023, 13 pages.

Author Unknown, "Technical Specification Group Radio Access Network; NR; Physical channels and modulation (Release 16)," Technical Specification 38.211, Version 16.1.0, Mar. 2020, 3GPP Organizational Partners, 130 pages.

Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.

Author Unknown, "Technical Specification Group Radio Access Network; NR; User Equipment (UE) radio access capabilities (Release 16)," Technical Specification 38.306, Version 16.0.0, Mar. 2020, 3GPP Organizational Partners, 64 pages.

Ericsson, "R1-20xxxxx: Corrections for multi-TRP transmission," 3GPP TSG-RAN WG1 Meeting #100bis-e, Apr. 20-30, 2020, e-meeting, 24 pages.

Intel Corporation, et al., "R1-1910686: Proposal for TEI: QCL Type D conflict between PDSCH and CSI-RS in FR2," 3GPP TSG RAN Meeting #98b, Oct. 14-20, 2019, Chongqing, China, 3 pages.

International Search Report and Written Opinion for International Patent Application No. PCT/IB2021/053016, mailed Jun. 18, 2021, 19 pages.

Written Opinion for International Patent Application No. PCT/IB2021/053016, mailed Mar. 1, 2022, 9 pages.

International Preliminary Report on Patentability for International Patent Application No. PCT/IB2021/053016, mailed May 24, 2022, 28 pages.

Examination Report for Indian Patent Application No. 202217062270, mailed Apr. 16, 2024, 6 pages.

Notice of Reasons for Refusal for Japanese Patent Application No. 2022-561662, mailed Jun. 18, 2024, 10 pages.

* cited by examiner

ONE SLOT (14 SYMBOLS)

CONTROL (PDCCH), POSSIBLY DATA

PDCH (DATA)

RESOURCE BLOCK

TIME

FREQUENCY

SYSTEM BANDWIDTH

ONE SLOT

OFDM SYMBOL #

0 1 2 3 4 5 6 7 8 9 10 11 12 13

SUBCARRIERS

A 14-SYMBOL SLOT

RESOURCE ELEMENT (A)

(B)

(A)

(B)

(A)

(B)

AP CSI-RS

PDSCH

1st and 2nd TCI States indicated in DCI

A SLOT

1st AP CSI-RS

2nd AP CSI-RS

PDSCH

1st and 2nd TCI States indicated in DCI

A SLOT

2500

2516

2516

2800

2812

RECEIVING TIME OVERLAPPING DOWNLINK REFERENCE SIGNALS AND CHANNELS

RELATED APPLICATIONS

This application is a 35 U.S.C. § 371 national phase filing of International Application No. PCT/IB2021/053016, filed Apr. 12, 2021, which claims the benefit of provisional patent application Ser. No. 63/008,386, filed Apr. 10, 2020, the disclosures of which are hereby incorporated herein by reference in their entireties.

TECHNICAL FIELD

This disclosure relates to aperiodic CSI-RS reception when it is overlapped in time with a Physical Downlink Shared Channel (PDSCH).

BACKGROUND

NR Frame Structure and Resource Grid

NR uses Cyclic Prefix Orthogonal Frequency Division Multiplexing (CP-OFDM) in both Downlink (DL) (i.e., from a network node, gNB, or base station, to a user equipment or UE) and Uplink (UL) (i.e., from UE to gNB). DFT spread OFDM is also supported in the uplink. In the time domain, NR downlink and uplink are organized into equally sized subframes of 1 ms each. A subframe is further divided into multiple slots of equal duration. The slot length depends on subcarrier spacing. For subcarrier spacing of $\Delta f=15$ kHz, there is only one slot per subframe, and each slot consists of 14 OFDM symbols.

Data scheduling in NR is typically in slot basis, an example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15\times2^\mu)$ kHz where $\mu \in \{0,1,2,3,4\}$. $\Delta f=15$ kHz is the basic subcarrier spacing. The slot durations in millisecond at different subcarrier spacings are given by $$\frac{1}{2^\mu} \text{ ms.}$$

In the frequency domain, a system bandwidth is divided into resource blocks (RBs); each corresponds to 12 contiguous subcarriers. The RBs are numbered starting with 0 from one end of the system bandwidth. The basic NR physical time-frequency resource grid is illustrated in FIG. 2, where only one Resource Block (RB) within a 14-symbol slot is shown. One OFDM subcarrier during one OFDM symbol interval forms one Resource Element (RE).

Downlink transmissions can be dynamically scheduled, i.e., in each slot the gNB transmits Downlink Control Information (DCI) over PDCCH about which UE data is to be transmitted to and which RBs and OFDM symbols in the current or future downlink slot the data is transmitted on. PDCCH is typically transmitted in the first few OFDM symbols in each slot in NR. The UE data are carried on PDSCH.

There are three DCI formats defined for scheduling PDSCH in NR, i.e., DCI format 1_0, DCI format 1_1, and DCI format 1_2. DCI format 1_0 has a smaller size than DCI 1_1 and can be used when a UE is not yet connected to the network while DCI format 1_1 can be used for scheduling MIMO (Multiple-Input-Multiple-Output) transmissions with up to 2 transport blocks (TBs). DCI format 1_2 is introduced in NR Release 16 (Rel-16) to support configurable size for certain bit fields in the DCI.

One or more of the following bit fields may be included in a DCI: Frequency Domain Resource Assignment (FDRA); Time Domain Resource Assignment (TDRA); Modulation and Coding Scheme (MCS); New data indicator (NDI); Redundancy Version (RV); HARQ process number; PUCCH Resource Indicator (PRI); PDSCH-to-HARQ_feedback timing indicator (K1); Antenna port(s); and Transmission Configuration Indication (TCI).

A UE first detects and decodes PDCCH and if the decoding is successful, it then decodes the corresponding PDSCH based on the decoded DCI carried in the PDCCH. The PDSCH decoding status is sent back to the gNB in the form of HARQ Acknowledgment or HARQ-ACK in a PUCCH resource indicated by the PRI. An example is illustrated in FIG. 3. The time offset, T1, between the reception of the DL DCI and the corresponding PDSCH is determined by a slot offset and starting symbol of the PDSCH indicated in the TDRA in the DCI. The time offset, T2, between the reception of the DL DCI and the corresponding HARQ ACK is provided by the PDSCH-to-HARQ_feedback timing indicator in the DCI.

Time Domain Resource Allocation

When the UE is scheduled to receive PDSCH by a DCI, the Time domain resource (TDRA) assignment field value m of the DCI provides a row index m+1 to a time domain resource allocation table. When a DCI is detected in a UE specific search space, the PDSCH time domain resource allocation is according to an RRC configured TDRA list by an RRC parameter pdsch-TimeDomainAllocationList provided in a UE specific PDSCH configuration, pdsch-Config. Each TDRA entry in the TDRA list defines a slot offset $K_0$ between the PDSCH and the PDCCH scheduling the PDSCH, a start and length indicator SLIV, the PDSCH mapping type (either Type A or Type B) to be assumed in the PDSCH reception, and optionally a repetition number RepNumR16.

TCI States

Demodulation Reference Signals (DM-RS) are used for coherent demodulation of PDSCH. The DM-RS is confined to resource blocks carrying the associated PDSCH and is mapped on allocated Resource Elements (REs) of the OFDM time-frequency grid in NR such that the receiver can efficiently handle time/frequency-selective fading radio channels. A PDSCH can have one or multiple DMRS, each associated with an antenna port. The antenna ports used for PDSCH are indicated in DCI scheduling the PDSCH.

Several signals can be transmitted from different co-located antenna ports. These signals can have the same large-scale properties, for instance in terms of Doppler shift/spread, average delay spread, average delay, or direction of arrival when measured at the receiver. These antenna ports are then said to be Quasi Co-Located (QCL). The network can then signal to the UE that two antenna ports are QCL. If the UE knows that two antenna ports are QCL with respect to a certain parameter (e.g., Doppler spread), the UE can estimate that parameter based on a reference signal transmitted on one of the antenna ports and use that estimate when receiving another reference signal or physical channel on the other antenna port. Typically, the first antenna port is represented by a measurement reference signal (known as a source RS) such as channel state information reference signal (CSI-RS) and the second antenna port is a DMRS (known as a target RS) for PDSCH reception.

In NR, a QCL relationship between a demodulation reference signal (DMRS) in PDSCH and other reference signals is described by a Transmission Configuration Indicator (TCI) state. A UE can be configured through radio resource control (RRC) signaling with up to 128 TCI states in NR Frequency Range 2 (FR2) and up to eight TCI states in NR Frequency Range (FR1), depending on UE capability. Each TCI state contains QCL information, for the purpose of PDSCH reception. A UE can be dynamically signaled one or two TCI states in the TCI field in a DCI scheduling a PDSCH.

A QCL relationship between a DMRS in PDCCH and other reference signals is described by a TCI state of a Control Resource Set (CORESET) over which the PDCCH is transmitted. For each CORESET configured to a UE, a list of TCI states is RRC configured; one of them is activated by a MAC CE. In NR Rel-15, up to three CORESETs per Bandwidth Part (BWP) can be configured for a UE. In NR Rel-16, up to five CORESETs per BWP may be configured to a UE, depending on capability.

There currently exist certain challenges. The existing NR standard defines the UE behavior when Aperiodic CSI-RS collides with PDSCH when the PDSCH is indicated with a single TCI state. However, UE behavior in other situations when Aperiodic CSI-RS collides with PDSCH are not defined. Therefore, improvements for handling collisions are needed.

SUMMARY

Systems and methods for determining Transmission Configuration Indication (TCI) states for Aperiodic (AP) Channel State Information Reference Signals (CSI-RSs) overlapping with Physical Downlink Shared Channel (PDSCH) transmission are provided. In some embodiments, a method performed by a wireless device for determining TCI states for receiving one or more AP CSI-RSs includes one or more of: receiving one or more AP CSI-RSs in the same symbol(s) as downlink transmission(s) scheduled by a DCI with two TCI states indicated in DCI; receiving triggering of the one or more AP CSI-RS with scheduling offset between the last symbol of the PDCCH carrying the triggering DCI and the first symbol of the AP CSI-RS resources, where the scheduling offset is smaller than a wireless device reported threshold; and determining that the downlink transmission is scheduled according to one of the group consisting of: "TDMSchemeA"; "FDMSchemeA"; "FDMSchemeB"; and a scheme where different sets of layers of the downlink transmission are received with different TCI states. In some embodiments, depending on circumstances, the wireless device applies a QCL assumption for a PDSCH transmission occasion when receiving the AP CSI-RS.

In some embodiments, a method performed by a base station for indicating TCI states for receiving one or more AP CSI-RSs includes one or more of: transmitting, to a wireless device, one or more AP CSI-RSs in the same symbol(s) as downlink transmission(s) scheduled by a DCI with two TCI states indicated in DCI; triggering one or more AP CSI-RS with scheduling offset between the last symbol of the PDCCH carrying the triggering DCI and the first symbol of the AP CSI-RS resources, where the scheduling offset is smaller than a wireless device reported threshold;

and scheduling the downlink transmission according to one of the group consisting of: "TDMSchemeA"; "FDMSchemeA"; "FDMSchemeB"; and a scheme where different sets of layers of the downlink transmission are received with different TCI states. In some embodiments, depending on circumstances, the base station assumes the wireless device applies a QCL assumption for a PDSCH transmission occasion when receiving the AP CSI-RS.

Certain embodiments may provide one or more of the following technical advantage(s). The proposed solution defines the UE behavior (i.e., what QCL assumptions the UE makes) to receive Aperiodic CSI-RS when Aperiodic CSI-RS collides with PDSCH when the PDSCH is indicated with two TCI states. One benefit is that the proposed solution defines with which QCL properties the colliding Aperiodic CSI-RSshould be received which is previously not defined in NR. With the proposed solution Aperiodic CSI-RS can be flexibly triggered in overlapping symbols with PDSCH scheduled according to one of single-PDCCH based NC-JT scheme "FDMSchemeA", "FDMSchemeB", and "TDMSchemeA".

In some embodiments, the downlink transmission(s) comprises PDSCH transmission(s). In some embodiments, the wireless device reported threshold comprises a beamSwitchTiming value.

In some embodiments, PDSCH is scheduled according to one of the group consisting of: "FDMSchemeA"; "FDMSchemeB"; and a scheme where different sets of layers of the PDSCH are received with different TCI states. In some embodiments, the scheduling offset from the last symbol of the PDCCH to the first symbol of the PDSCH is larger than or equal to the threshold timeDurationForQCL.

In some embodiments, when a single triggered AP CSI-RS is in the same symbols as PDSCH, the method also includes the wireless device applying a QCL assumption given by the 1st indicated TCI state in DCI for the PDSCH when receiving the AP CSI-RS. In some embodiments, when two triggered AP CSI-RSs are in the same symbols as PDSCH, the method also includes the wireless device applying the QCL assumption given by the $1^{st}$ and $2^{nd}$ indicated TCI states in DCI for the PDSCH when receiving the $1^{st}$ and $2^{nd}$AP CSI-RS, respectively.

In some embodiments, the $1^{st}$ and $2^{nd}$ triggered AP CSI-RSs are according to a sorting of the corresponding CSI-RS resource identifier or a sorting of the corresponding CSI-RS resource set identifiers to which the two AP CSI-RSs belong to. In some embodiments, the scheduling offset from the last symbol of the PDCCH to the first symbol of the PDSCH is smaller than the threshold timeDurationForQCL.

In some embodiments, when a single triggered AP CSI-RS is in the same symbols as PDSCH, the method also includes the wireless device applying the QCL assumption given by the 1st default TCI state for the PDSCH when receiving the AP CSI-RS. In some embodiments, when two triggered AP CSI-RSs are in the same symbols as PDSCH, the method also includes the wireless device applying the QCL assumption given by the $1^{st}$ and $2^{nd}$ default TCI states for the PDSCH when receiving the $1^{st}$ and $2^{nd}$AP CSI-RS, respectively.

In some embodiments, the $1^{st}$ and $2^{nd}$ triggered AP CSI-RSs are according to a sorting of the corresponding CSI-RS resource identifier or a sorting of the corresponding CSI-RS resource set identifiers to which the two AP CSI-RSs belong to.

In some embodiments, PDSCH is scheduled according to "TDMSchemeA". In some embodiments, the scheduling offset from the last symbol of the PDCCH to the first symbol of the first PDSCH transmission occasion is larger than or equal to the threshold timeDurationForQCL. In some embodiments, when a single triggered AP CSI-RS is in the same symbols as the first PDSCH transmission occasion, the method also includes the wireless device applying the QCL assumption given by the 1st indicated TCI state in DCI for the first PDSCH transmission occasion when receiving the AP CSI-RS. In some embodiments, when a single triggered AP CSI-RS is in the same symbols as the second PDSCH transmission occasion, the method also includes the wireless device applying the QCL assumption given by the 2nd indicated TCI state in DCI for the second PDSCH transmission occasion when receiving the AP CSI-RS.

In some embodiments, the scheduling offsets from the last symbol of the PDCCH to the first symbol of the first and second PDSCH transmission occasions are both smaller than the threshold timeDurationForQCL. In some embodiments, when a single triggered AP CSI-RS is in the same symbols as the first PDSCH transmission occasion, the method also includes the wireless device applying the QCL assumption given by the 1st default TCI state in DCI for the first PDSCH transmission occasion when receiving the AP CSI-RS. In some embodiments, when a single triggered AP CSI-RS is in the same symbols as the second PDSCH transmission occasion, the method also includes the wireless device applying the QCL assumption given by the 2nd indicated TCI state in DCI for the second PDSCH transmission occasion when receiving the AP CSI-RS.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figures 1, 2:
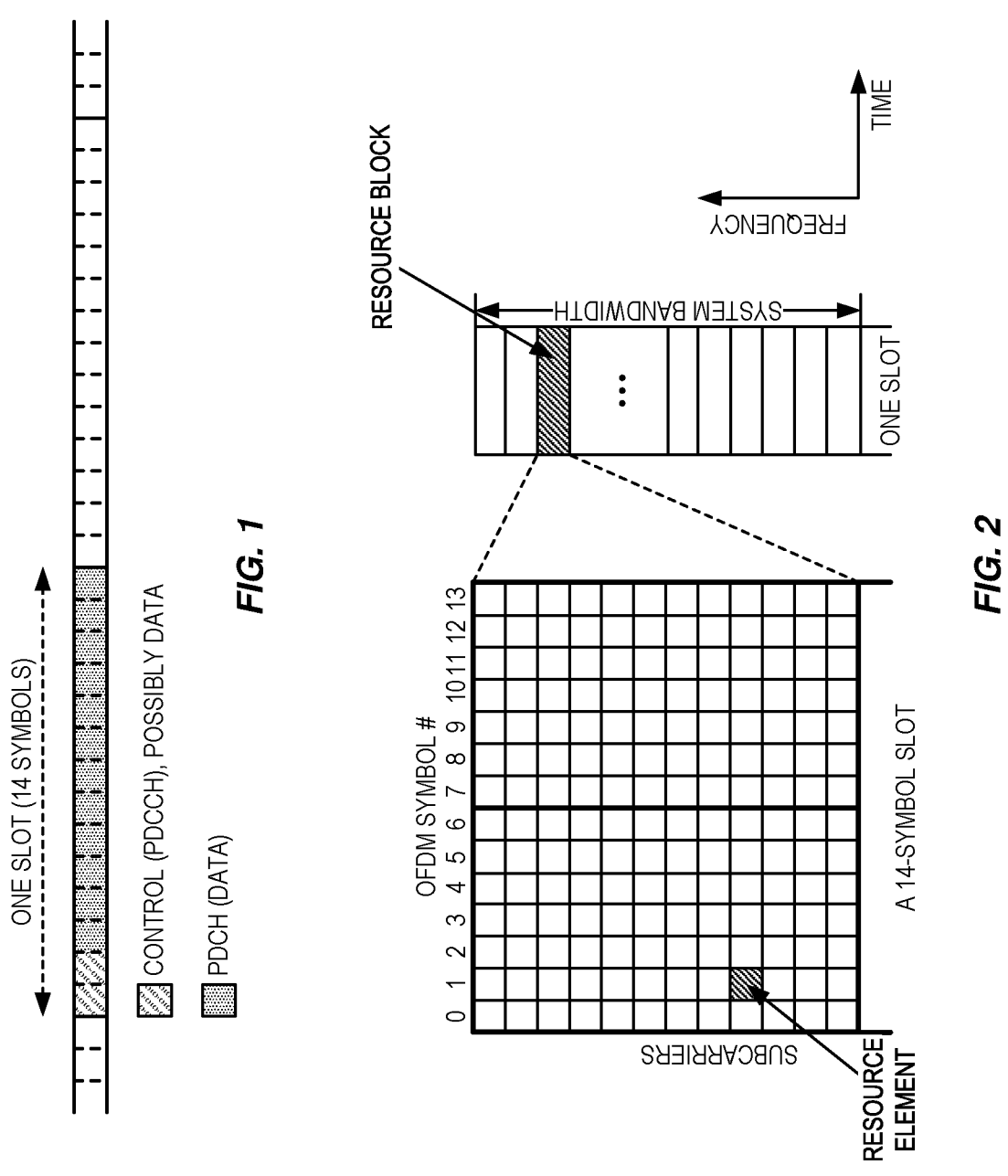
FIG. 1 illustrates data scheduling in NR which is typically in slot basis, an example is shown with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH)
FIG. 2 illustrates a basic NR physical time-frequency resource grid.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 4:
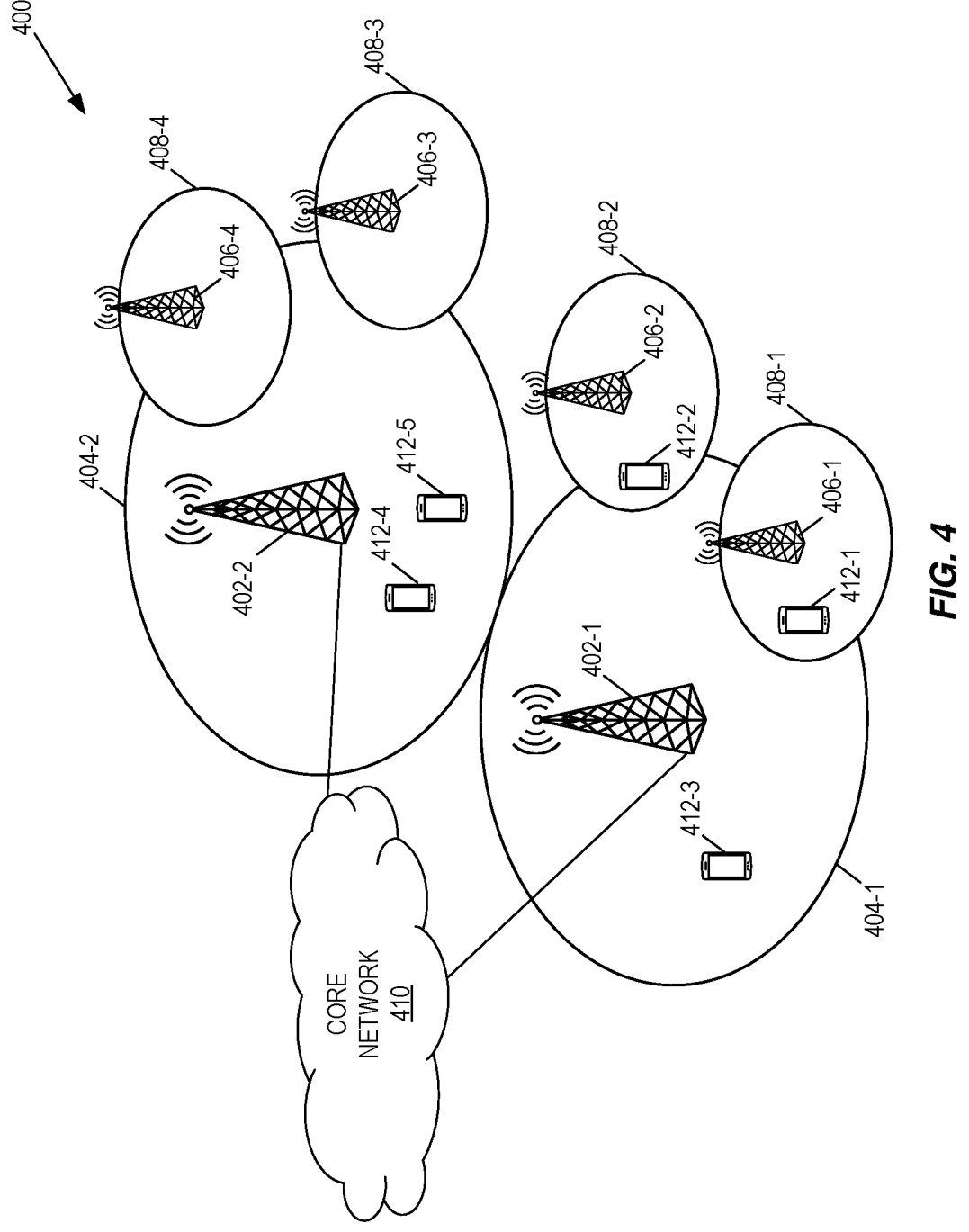
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G System (5GS) including a NR RAN or LTE RAN (i.e., Evolved Universal Terrestrial Radio Access (E-UTRA) RAN). In this example, the RAN includes base stations 402-1 and 402-2, which in 5G NR are referred to as gNBs (e.g., LTE RAN nodes connected to 5G Core (5GC), which are referred to as gn-eNBs), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5G Core (5GC). The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Downlink transmissions can be dynamically scheduled, i.e., in each slot the gNB transmits Downlink Control Information (DCI) over PDCCH about which UE data is to be transmitted to and which RBs and OFDM symbols in the current downlink slot the data is transmitted on. PDCCH is typically transmitted in the first few OFDM symbols in each slot in NR. The UE data are carried on PDSCH.

There are three DCI formats defined for scheduling PDSCH in NR, i.e., DCI format 1_0, DCI format 1_1, and DCI format 1_2. DCI format 1_0 has a smaller size than DCI 1_1 and can be used when a UE is not connected to the network while DCI format 1_1 can be used for scheduling MIMO (Multiple-Input-Multiple-Output) transmissions with up to 2 transport blocks (TBs). DCI format 1_2 is introduced in NR Release 16 (Rel-16) to support configurable size for certain bit fields in the DCI.

One or more of the following bit fields may be included in a DCI: Frequency Domain Resource Assignment (FDRA); Time Domain Resource Assignment (TDRA); Modulation and Coding Scheme (MCS); New data indicator (NDI); Redundancy Version (RV); HARQ process number; PUCCH Resource Indicator (PRI); PDSCH-to-HARQ_feedback timing indicator (K1); Antenna port(s); and Transmission Configuration Indication (TCI).

Figure 3:
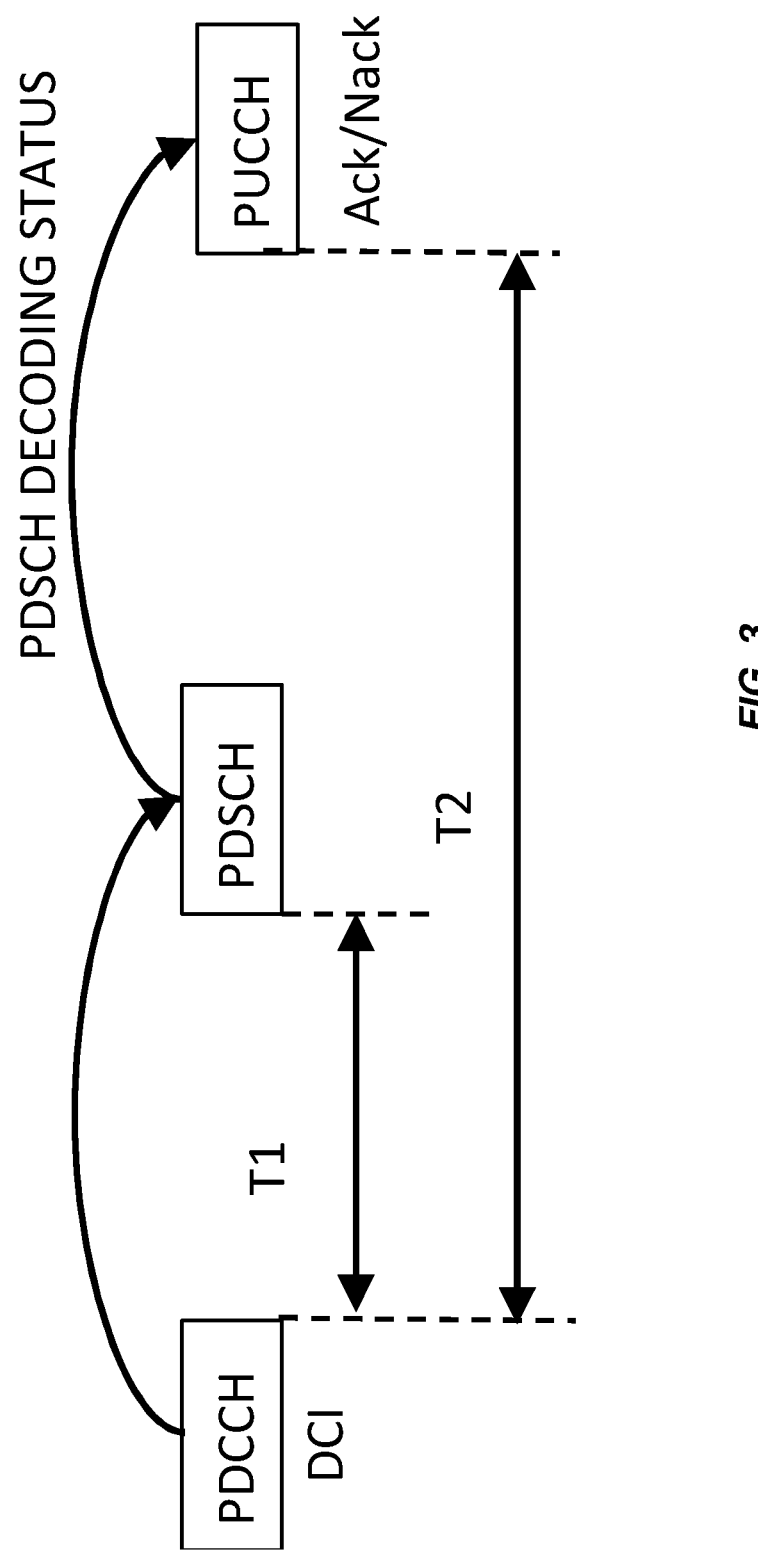
FIG. 3 illustrates an example where PDSCH decoding status is sent back to the gNB in the form of HARQ Acknowledgment in a PUCCH resource indicated by PRI according to some embodiments of the present disclosure.

A UE first detects and decodes PDCCH and if the decoding is successful, it then decodes the corresponding PDSCH based on the decoded DCI carried in the PDCCH. The PDSCH decoding status is sent back to the gNB in the form of HARQ Acknowledgment in a PUCCH resource indicated by PRI. An example is illustrated in FIG. 3. The time offset, T1, between the reception of the DL DCI and the corresponding PDSCH determined by a slot offset and starting symbol of the PDSCH indicated in TDRA in the DCI. The time offset, T2, between the reception of the DL DCI and the corresponding HARQ ACK is provided by the PDSCH-to-HARQ_feedback timing indicator in the DCI.

Time Domain Resource Allocation

When the UE is scheduled to receive PDSCH by a DCI, the Time domain resource (TDRA) assignment field value m of the DCI provides a row index m+1 to a time domain resource allocation table. When a DCI is detected, the PDSCH time domain resource allocation is according to an RRC configured TDRA list by an RRC parameter pdsch-TimeDomainAllocationList provided in a UE specific PDSCH configuration, pdsch-Config. Each TDRA entry in the TDRA list defines a slot offset $K_0$ between the PDSCH and the PDCCH scheduling the PDSCH, a start and length indicator SLIV, the PDSCH mapping type (either Type A or Type B) to be assumed in the PDSCH reception, and optionally a repetition number RepNumR16.

TCI States

Demodulation Reference Signals (DM-RS) are used for coherent demodulation of PDSCH. The DM-RS is confined to resource blocks carrying the associated PDSCH and is mapped on allocated Resource Elements (REs) of the OFDM time-frequency grid in NR such that the receiver can efficiently handle time/frequency-selective fading radio channels. A PDSCH can have one or multiple DMRS, each associated with an antenna port. The antenna ports used for PDSCH are indicated in DCI scheduling the PDSCH.

Several signals can be transmitted from different antenna ports in a same location. These signals can have the same large-scale properties, for instance in terms of Doppler shift/spread, average delay spread, or average delay, when measured at the receiver. These antenna ports are then said to be Quasi Co-Located (QCL). The network can then signal to the UE that two antenna ports are QCL. If the UE knows that two antenna ports are QCL with respect to a certain parameter (e.g., Doppler spread), the UE can estimate that parameter based on a reference signal transmitted one of the antenna ports and use that estimate when receiving another reference signal or physical channel the other antenna port. Typically, the first antenna port is represented by a measurement reference signal such as channel state information reference signal (CSI-RS) (known as a source RS) and the second antenna port is a DMRS (known as a target RS) for PDSCH reception.

In NR, a QCL relationship between a demodulation reference signal (DMRS) in PDSCH and other reference signals is described by a TCI state. A UE can be configured through RRC signaling with up to 128 TCI states in Frequency Range 2 (FR2) and up to eight TCI states in FR1, depending on UE capability. Each TCI state contains QCL information, for the purpose of PDSCH reception. A UE can be dynamically signaled one or two TCI states in the TCI field in a DCI scheduling a PDSCH.

A QCL relationship between a DMRS in PDCCH and other reference signals is described by a TCI state of a Control Resource Set (CORESET) over which the PDCCH is transmitted. For each CORESET configured to a UE, a list of TCI states is RRC configured; one of them is activated by a MAC CE. In NR Rel-15, up to three CORESETs per Bandwidth Part (BWP) can be configured for a UE. In NR Rel-16, up to five CORESETs per BWP may be configured to a UE, depending on capability.

PDSCH Transmission Over Multiple Transmission Points or Panels (TRP)

In one scenario, downlink data are transmitted over multiple TRPs in which different MIMO layers are transmitted over different TRPs. This is referred to a Non-coherent Joint Transmission (NC-JT). In another scenario, different time/frequency resources may be allocated to different TRPs and one or multiple PDSCH is transmitted over different TRPs. Two ways of scheduling multi-TRP transmission are specified in NR Rel-16: multi-PDCCH based multi-TRP transmission and single-PDCCH based multi-TRP transmission. The multi-PDCCH based multi-TRP transmission and single-PDCCH based multi-TRP transmission can be used to serve downlink eMBB traffic as well as downlink URLLC traffic to the UE.

Multi-PDCCH Based DL Data Transmission Over Multiple Transmission Points (TRP)

Figure 5:
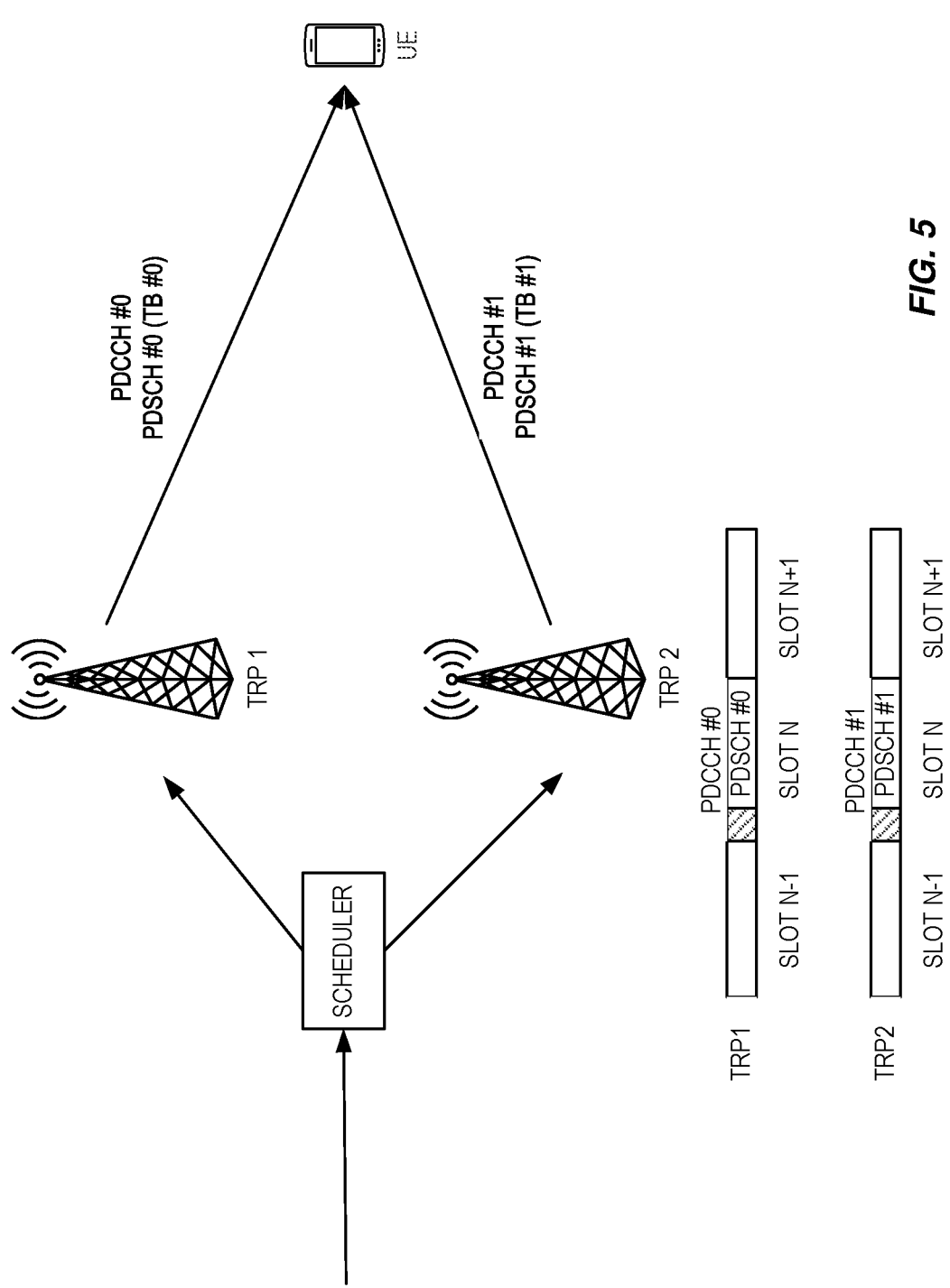
FIG. 5 illustrates where data are sent to a UE over two TRPs, each TRP carrying one TB mapped to one code word, according to some embodiments of the present disclosure.

An example is shown in FIG. 5, where data are sent to a UE over two TRPs, each TRP carrying one TB mapped to one code word. When the UE has four receive antennas while each of the TRPs has only two transmit antennas, the UE can support up to four MIMO layers, but each TRP can maximally transmit two MIMO layers. In this case, by transmitting data over two TRPs to the UE, the peak data rate to the UE can be increased as up to four aggregated layers from the two TRPs can be used. This is beneficial when the traffic load and thus the resource utilization, is low in each TRP. In this example, a single scheduler is used to schedule data over the two TRPs. One PDCCH is transmitted from each of the two TRPs in a slot, each schedule one PDSCH. This is referred to as a multi-PDCCH or multi-DCI scheme in which a UE receives two PDCCHs and the associated two PDSCHs in a slot from two TRPs.

In NR specification 3GPP TS 38.211, there is a restriction stating:

"The UE may assume that the PDSCH DM-RS within the same CDM group are quasi co-located with respect to Doppler shift, Doppler spread, average delay, delay spread, and spatial Rx."

In cases where a UE is not scheduled with all DMRS ports within a CDM group, there may be another UE simultaneously scheduled, using the remaining ports of that CDM group. The UE can then estimate the channel for that other UE (thus an interfering signal) in order to perform coherent interference suppression. Hence, this is useful in MU-MIMO scheduling and UE interference suppression.

Figure 6:
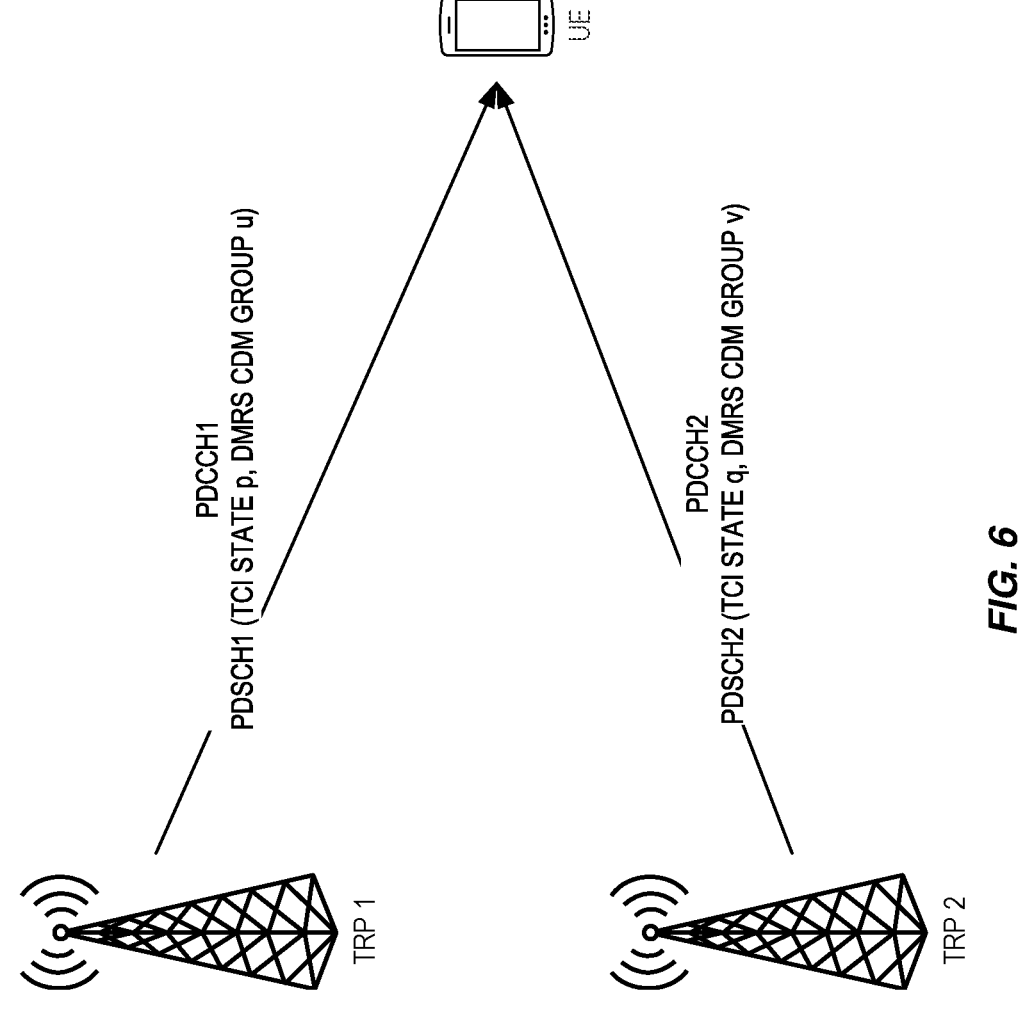
FIG. 6 illustrates an example relationship between TCI states and DM-RS CDM groups for a multiple-PDCCH multi-TRP scenario, according to some embodiments of the present disclosure.

In case of a multi-TRP scenario, in which the UE receives PDSCHs via multiple PDCCHs transmitted from different TRPs, the signals transmitted from different TRPs will most likely not be quasi-collocated as the TRPs may be spatially separated. In this case, the PDSCHs transmitted from different TRPs will have different TCI states associated with them. Furthermore, according to the above restriction from 3GPP TS 38.211, two PDSCH DM-RSs associated with two TRPs will have to belong to different DM-RS CDM groups (as the two PDSCH DM-RSs are not QCL, they cannot belong to the same DM-RS CDM group). FIG. 6 illustrates an example relationship between TCI states and DM-RS CDM groups for a multiple-PDCCH multi-TRP scenario. In the example, PDSCH1 is associated with TCI State p, and PDSCH 2 is associated with TCI state q. The PDSCH DM-RSs from the different TRPs also belong to different DM-RS CDM groups as they are not quasi-collocated. In the example, the DMRS for PDSCH1 belongs to CDM group awhile the DMRS for PDSCH2 belongs to CDM group v.

Single-PDCCH Based DL Data Transmission Over Multiple Transmission Points (TRP)

A PDSCH may be transmitted to a UE from multiple TRPs. Since different TRPs may be located in different physical locations and/or have different beams, the propagation channels can be different. To facilitate receiving PDSCH data from different TRPs or beams, a UE may be indicated with two TCI states, each associated with a TRP or a beam, by a single codepoint of a TCI field in a DCI.

Figure 7:
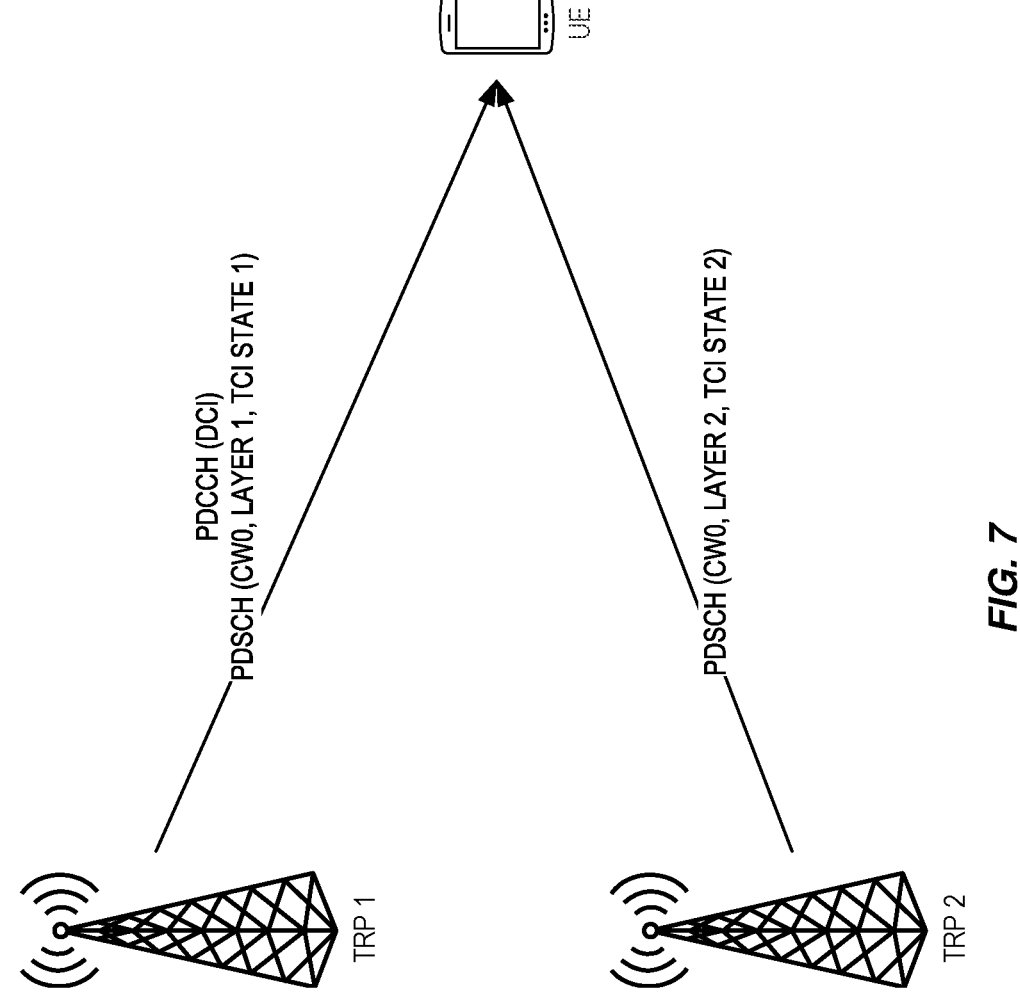
FIG. 7 illustrates one example of PDSCH transmission over two TRPs using a single DCI, according to some embodiments of the present disclosure.

One example of PDSCH transmission over two TRPs using a single DCI is shown in FIG. 7, where different layers of a PDSCH with a single codeword (e.g., CW0) are sent over two TRPs, each associated with a different TCI state. In this case, two DMRS ports, one for each layer, in two CDM groups are also signaled to the UE. A first TCI state is associated with the DMRS port in a first CDM group, and a second TCI state is associated with the DMRS port in a second CDM group. This approach is often referred to as NC-JT (Non-coherent joint transmission) or scheme 1a in NR Rel-16 3GPP discussions.

Transmitting PDSCH over multiple TRPs can also be used to improve PDSCH transmission reliability for URLLC applications. A number of approaches are introduced in NR Rel-16 including "FDMSchemeA", "FDMSchemeB", "TDMSchemeA" and Slot based TDM scheme. Note that the terminology Scheme 4 is used in the discussions involving Slot based TDM scheme in NR Rel-16 3GPP discussions.

Figure 8:
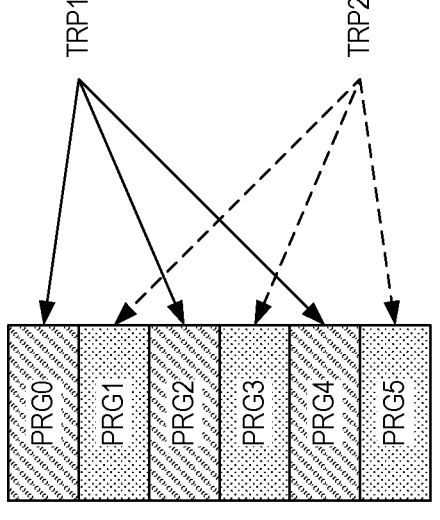
FIG. 8 illustrates an example of multi-TRP PDSCH transmission with FDMSchemeA, according to some embodiments of the present disclosure.
Figure 8:
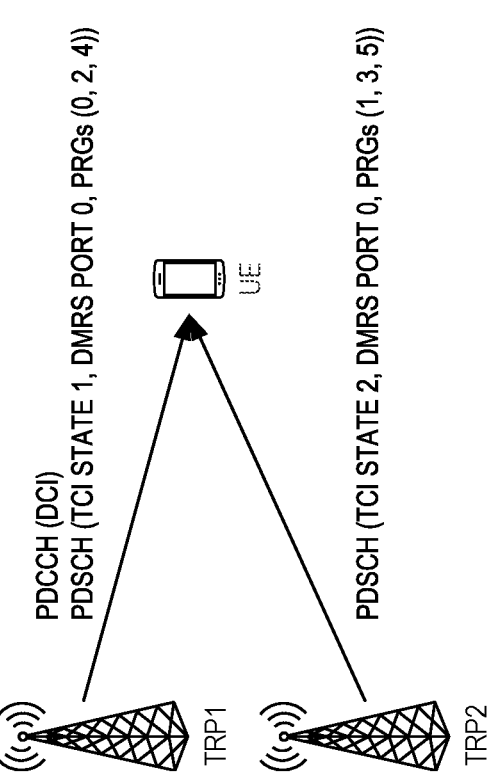

An example of multi-TRP PDSCH transmission with FDMSchemeA is shown in FIG. 8, where a PDSCH is sent over TRP1 in PRGs (precoding RB group) {0,2,4} and over TRP2 in PRGs {1,3,5}. The transmission from TRP1 is associated with TCI state 1, while the transmission from TRP2 is associated with TCI state 2. Since the transmissions from TRP1 and TRP2 are non-overlapping in the case of FDMSchemeA, the DMRS ports can be the same (i.e., DMRS port 0 used for both transmissions). The PDSCH is scheduled by a PDCCH which is sent over TRP1.

Figure 9:
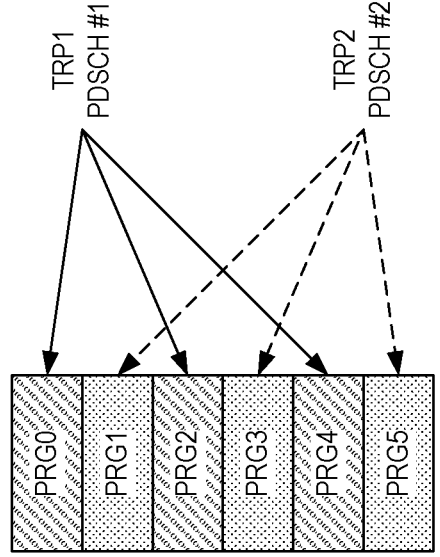
FIG. 9 shows an example data transmission with FDMSchemeB in which PDSCH #1 is transmitted in PRGs {0, 2, 4} from TRP1 and PDSCH #2 with the same TB is transmitted in PRGs {1, 3, 5} from TRP2, according to some embodiments of the present disclosure.
Figure 9:
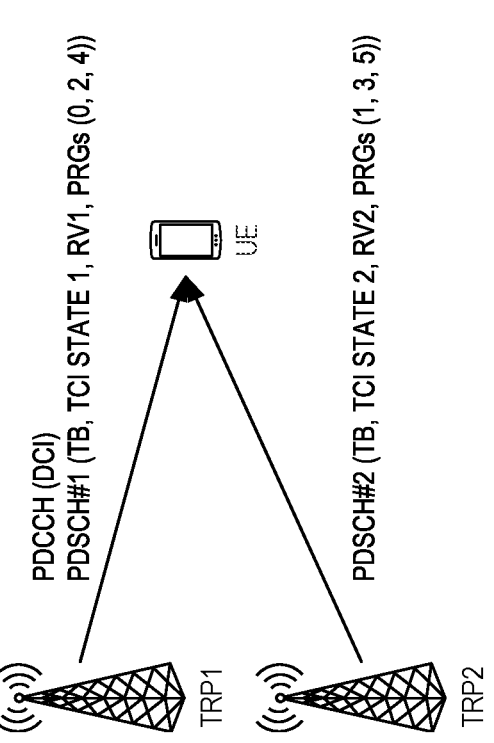

FIG. 9 shows an example data transmission with FDMSchemeB in which PDSCH #1 is transmitted in PRGs {0, 2, 4} from TRP1 and PDSCH #2 with the same TB is transmitted in PRGs {1, 3, 5} from TRP2. The transmission from TRP1 is associated with TCI state 1, while the transmission from TRP2 is associated with TCI state 2. Since the transmissions from TRP1 and TRP2 are non-overlapping in the case of FDMSchemeB, the DMRS ports can be the same (i.e., DMRS port 0 used for both transmissions). The two PDSCHs carry the same encoded data payload but with a same or different redundancy version so that the UE can do soft combining of the two PDSCHs to achieve more reliable reception.

Figures 10, 11:
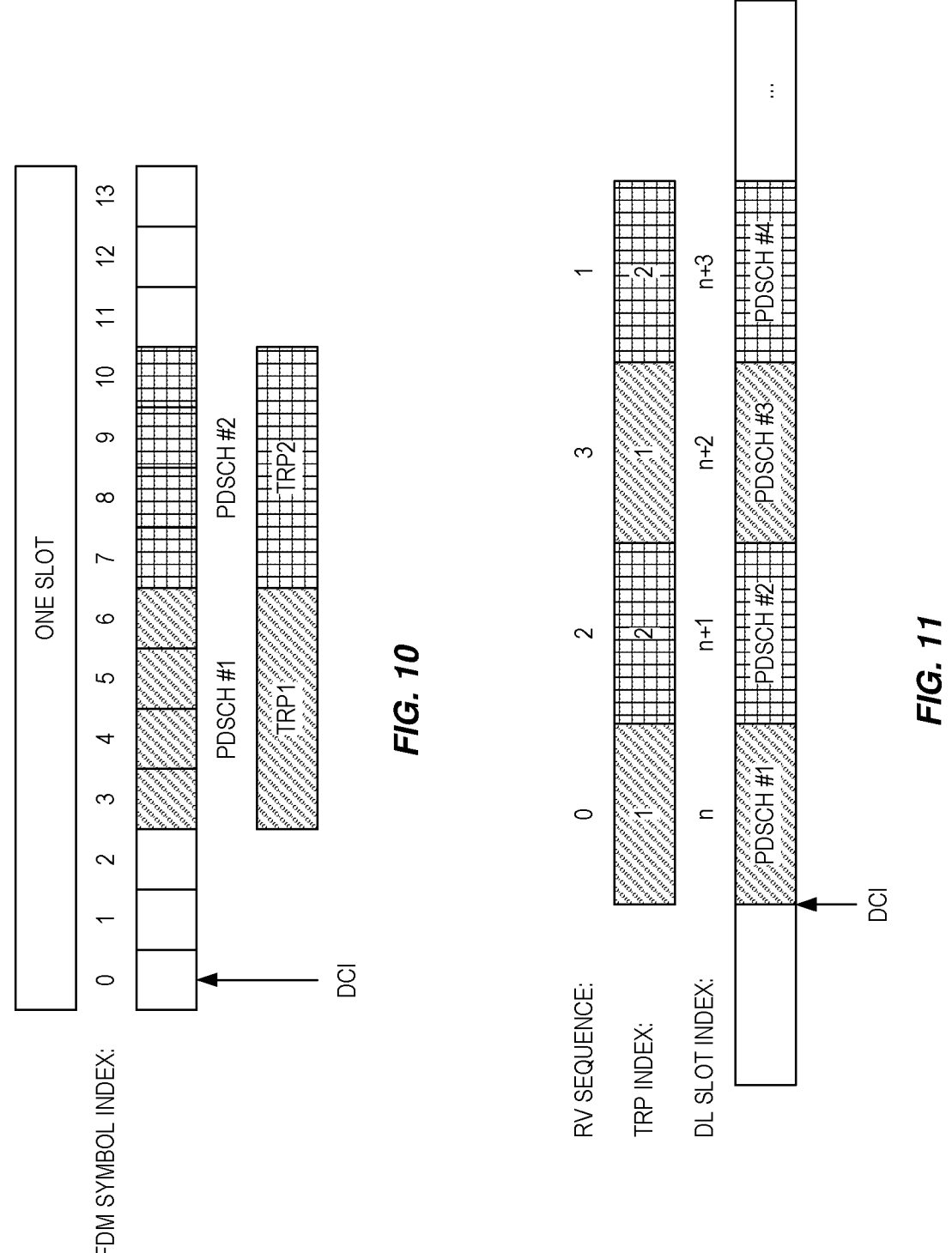
FIG. 10 shows an example data transmission with TDMSchemeA in which PDSCH repetition occurs in mini-slots of four OFDM symbols within a slot, according to some embodiments of the present disclosure.
FIG. 11 illustrates an example Multi-TRP data transmission with Slot based TDM scheme, according to some embodiments of the present disclosure.

FIG. 10 shows an example data transmission with TDMSchemeA in which PDSCH repetition occurs in mini-slots of four OFDM symbols within a slot. Each PDSCH can be associated with a same or different RV. The transmission of PDSCH #1 from TRP1 is associated with a first TCI state, while the transmission of PDSCH #2 from TRP2 is associated with a second TCI state.

An example Multi-TRP data transmission with Slot based TDM scheme is shown in FIG. 11, where four PDSCHs for a same TB are transmitted over two TRPs and in four consecutive slots. Each PDSCH is associated with a different RV. The transmission of odd numbered PDSCHs from TRP1 are associated with a first TCI state, while the transmission of even numbered PDSCHs from TRP2 is associated with a second TCI state.

For all the single-PDCCH based DL multi-TRP PDSCH schemes, a single DCI transmitted from one TRP is used to schedule multiple PDSCH transmissions over two TRPs.

The network configures the UE with multiple TCI states via RRC, and a new MAC CE was introduced in NR Rel-16. This MAC CE can be used to map a codepoint in the TCI field to one or two TCI states.

Default TCI State(s)

Single TRP Transmission

If no TCI codepoints are mapped to two different TCI states and the time offset between the reception of a DL DCI and the corresponding PDSCH is less than a threshold timeDurationForQCL configured by higher layers, instead of using the TCI state indicated in the TCI field in DCI scheduling a PDSCH, the UE may assume that the TCI state for the PDSCH is given by the TCI state activated for a CORESET with the lowest ControlResourceSetId among one or more CORESETs in the latest slot in an active BWP of a serving cell monitored by the UE. The TCI state is referred here as the default TCI state. If none of configured TCI states for the serving cell of scheduled PDSCH contains 'QCL-TypeD', the UE shall obtain the other QCL assumptions from the TCI states indicated by DCI for its scheduled PDSCH irrespective of the time offset between the reception of the DL DCI and the corresponding PDSCH.

Multi-TRP Transmission

If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint is configured with two TCI states, the UE may assume that the TCI states for the PDSCH are given by the TCI states corresponding to the lowest codepoint among the TCI codepoints containing two different TCI states. In this case, the two TCI states are the default TCI states.

A default TCI state corresponds to a Rx beam used by the UE to receive (and buffer) a PDSCH before the corresponding DCI is decoded (because before DCI decoding, UE doesn't know what TCI state(s) is needed for receive the PDSCH. Otherwise, a wrong Rx beam could be used and the PDSCH could be lost if the time offset between the DCI and the PDSCH, which is unknown before the DCI is decoded, is below the threshold.

Channel State Information Reference Signals (CSI-RS)

For CSI measurement and feedback, CSI-RSs are defined. A CSI-RS is transmitted on each transmit antenna (or antenna port) and is used by a UE to measure downlink channel between each of the transmit antenna ports and each receive antenna. The antenna ports are also referred to as CSI-RS ports. The supported numbers of antenna ports in NR are {1, 2, 4, 8, 12, 16, 24, 32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

Figure 12:
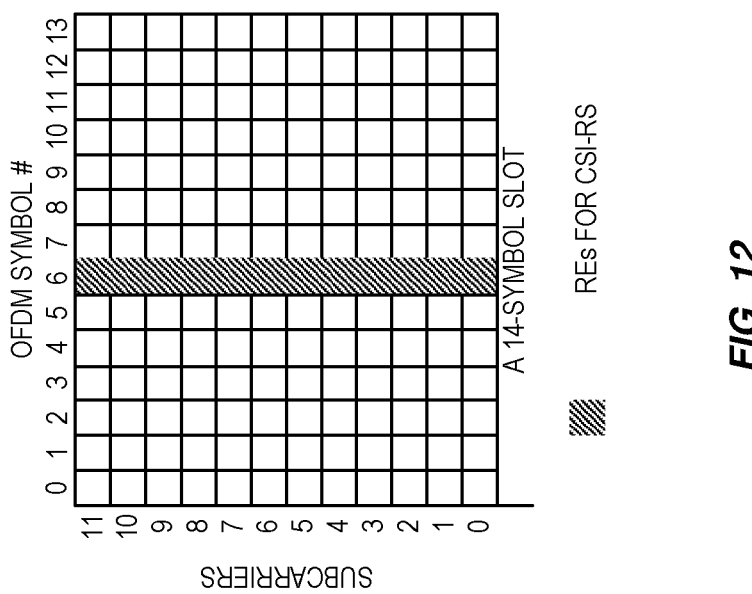
FIG. 12 shows an example of CSI-RS REs for 12 antenna ports, where 1RE per RB per port is shown, according to some embodiments of the present disclosure.

NZP CSI-RS can be configured to be transmitted in certain REs in a slot and certain slots. FIG. 12 shows an example of CSI-RS REs for 12 antenna ports, where 1RE per RB per port is shown.

In addition, CSI Interference Measurement resource (CSI-IM) is also defined in NR for a UE to measure interference. A CSI-IM resource contains four REs, either four adjacent RE in frequency in the same OFDM symbol or two by two adjacent REs in both time and frequency in a slot. By measuring both the channel based on NZP CSI-RS and the interference based on CSI-IM, a UE can estimate the effective channel and noise plus interference to determine the CSI, i.e., rank, precoding matrix, and the channel quality.

In NR, the CSI-RS can be aperiodic CSI-RS, semi-persistent CSI-RS, and periodic CSI-RS. Aperiodic CSI-RS transmission is typically triggered by a UL DCI (i.e., DCI format 0_1 and DCI format 0_2).

CSI Framework in NR

In NR, a UE can be configured with multiple CSI reporting settings (each represented by a higher layer parameter CSI-ReportConfig with an associated identity ReportConfigID) and multiple CSI resource settings (each represented by a higher layer parameter CSI-ResourceConfig with an associated identity CSI-ResourceConfigId). Each CSI resource setting can contain multiple CSI resource sets (each represented by a higher layer parameter NZP-CSI-RS-ResourceSet with an associated identity NZP-CSI-RS-ResourceSetId for channel measurement or by a higher layer parameter CSI-IM-ResourceSet with an associated identity CSI-IM-ResourceSetId for interference measurement), and each NZP CSI-RS resource set for channel measurement can contain up to eight NZP CSI-RS resources. For each CSI reporting setting, a UE feeds back a set of CSI, which may include one or more of a CSI-RS Resource Indicator (CRI), a RI, a PMI, and a CQI per CW, depending on the configured report quantity.

In each CSI reporting setting, it contains one or more of the following information:

A CSI resource setting for channel measurement based on NZP CSI-RS resources (represented by a higher layer parameter resourcesForChannelMeasurement)

A CSI resource setting for interference measurement based on CSI-IM resources (represented by a higher layer parameter csi-IM-ResourcesForInterecerence)

Optionally, a CSI resource setting for interference measurement based on NZP CSI-RS resources (represented by a higher layer parameter nzp-CSI-RS-ResourcesForInterecerence)

Time-domain behavior, i.e., periodic, semi-persistent, or aperiodic reporting (represented by a higher layer parameter reportConfigType)

Frequency granularity, i.e., wideband or subband

CSI parameters to be reported such as RI, PMI, CQI, L1-RSRP/L1_SINR and CRI in case of multiple NZP CSI-RS resources in a resource set is used for channel measurement (represented by a higher layer parameter reportQuantity, such as 'cri-RI-PMI-CQI"cri-RSRP', or 'ssb-Index-RSRP')

Codebook types, i.e., type I or II if reported, and codebook subset restriction

Measurement restriction

For periodic and semi-static CSI reporting, only one NZP CSI-RS resource set can be configured for channel measurement and one CSI-IM resource set for interference measurement. For aperiodic CSI reporting, a CSI resource setting for channel measurement can contain more than one NZP CSI-RS resource set for channel measurement. If the CSI resource setting for channel measurement contains multiple NZP CSI-RS resource sets for aperiodic CSI report, only one NZP CSI-RS resource set can be selected and indicated to a UE. For aperiodic CSI reporting, a list of trigger states (given by the higher layer parameters CSI-AperiodicTriggerStateList). Each trigger state in CSI-AperiodicTriggerStateList contains a list of associated CSI-ReportConfigs indicating the Resource Set IDs for channel and optionally for interference. For a UE configured with the higher layer parameter CSI-AperiodicTnggerStateList, if a Resource Setting linked to a CSI-ReportConfig has multiple aperiodic resource sets, only one of the aperiodic CSI-RS resource sets from the Resource Setting is associated with the trigger state, and the UE is higher layer configured per trigger state per Resource Setting to select the one NZP CSI-RS resource set from the Resource Setting.

When more than one NZP CSI-RS resources are contained in the selected NZP CSI-RS resource set for channel measurement, a CSI-RS Resource Indicator (CRI) is reported by the UE to indicate to the gNB about the one selected NZP CSI-RS resource in the resource set, together with RI, PMI and CQI associated with the selected NZP CSI-RS resource. This type of CSI assumes that a PDSCH is transmitted from a single Transmission Reception Point (TRP) and the CSI is also referred to as single TRP CSI.

Existing NR UE Behavior when Aperiodic CSI-RS Collides with PDSCH

The following UE behavior is specified in existing NR specifications in TS 38.214 when it comes to Aperiodic CSI-RS colliding with PDSCH:

If the scheduling offset between the last symbol of the PDCCH carrying the triggering DCI and the first symbol of the aperiodic CSI-RS resources is smaller than the UE reported threshold beamSwitchTiming as defined in [TS 38.306]:

if there is a PDSCH with an indicated TCI state in the same symbols as the CSI-RS where the PDSCH is scheduled with a scheduling offset larger than or equal to the threshold timeDurationForQCL, the UE applies the QCL assumption of the PDSCH also when receiving the aperiodic CSI-RS.

else, when receiving the aperiodic CSI-RS, the UE applies the QCL assumption used for the CORESET associated with a monitored search space with the lowest controlResourceSetId in the latest slot in which one or more CORESETs within the active BWP of the serving cell are monitored.

There currently exist certain challenges. The existing NR standard defines the UE behavior when Aperiodic CSI-RS collides with PDSCH when the PDSCH is indicated with a single TCI state. How the UE behaves (i.e., what QCL assumptions the UE makes) to receive Aperiodic CSI-RS when Aperiodic CSI-RS collides with PDSCH(s) that are indicated with two TCI states in DCI is not defined in current NR specification, which is an open problem that needs to be solved. Specifically, this UE behavior when PDSCH uses one of the following schemes is not defined: single-PDCCH based NC-JT scheme; "FDMSchemeA"; "FDMSchemeB"; "TDMSchemeA".

Systems and methods for determining Transmission Configuration Indication (TCI) states for Aperiodic (AP) Channel State Information Reference Signals (CSI-RSs) overlapping with Physical Downlink Shared Channel (PDSCH) transmission are provided. In some embodiments, a method performed by a wireless device for determining TCI states for receiving one or more AP CSI-RSs includes one or more of: receiving one or more AP CSI-RSs in the same symbol(s) as downlink transmission(s) scheduled by a DCI with two TCI states indicated in DCI; receiving triggering of the one or more AP CSI-RS with scheduling offset between the last symbol of the PDCCH carrying the triggering DCI and the first symbol of the AP CSI-RS resources, where the scheduling offset is smaller than a wireless device reported threshold; and determining that the downlink transmission is scheduled according to one of the group consisting of: "TDMSchemeA"; "FDMSchemeA"; "FDMSchemeB"; and a scheme where different sets of layers of the downlink transmission are received with different TCI states. In some embodiments, depending on circumstances, the wireless device applies a QCL assumption for a PDSCH transmission occasion when receiving the AP CSI-RS.

Figures 13, 14:
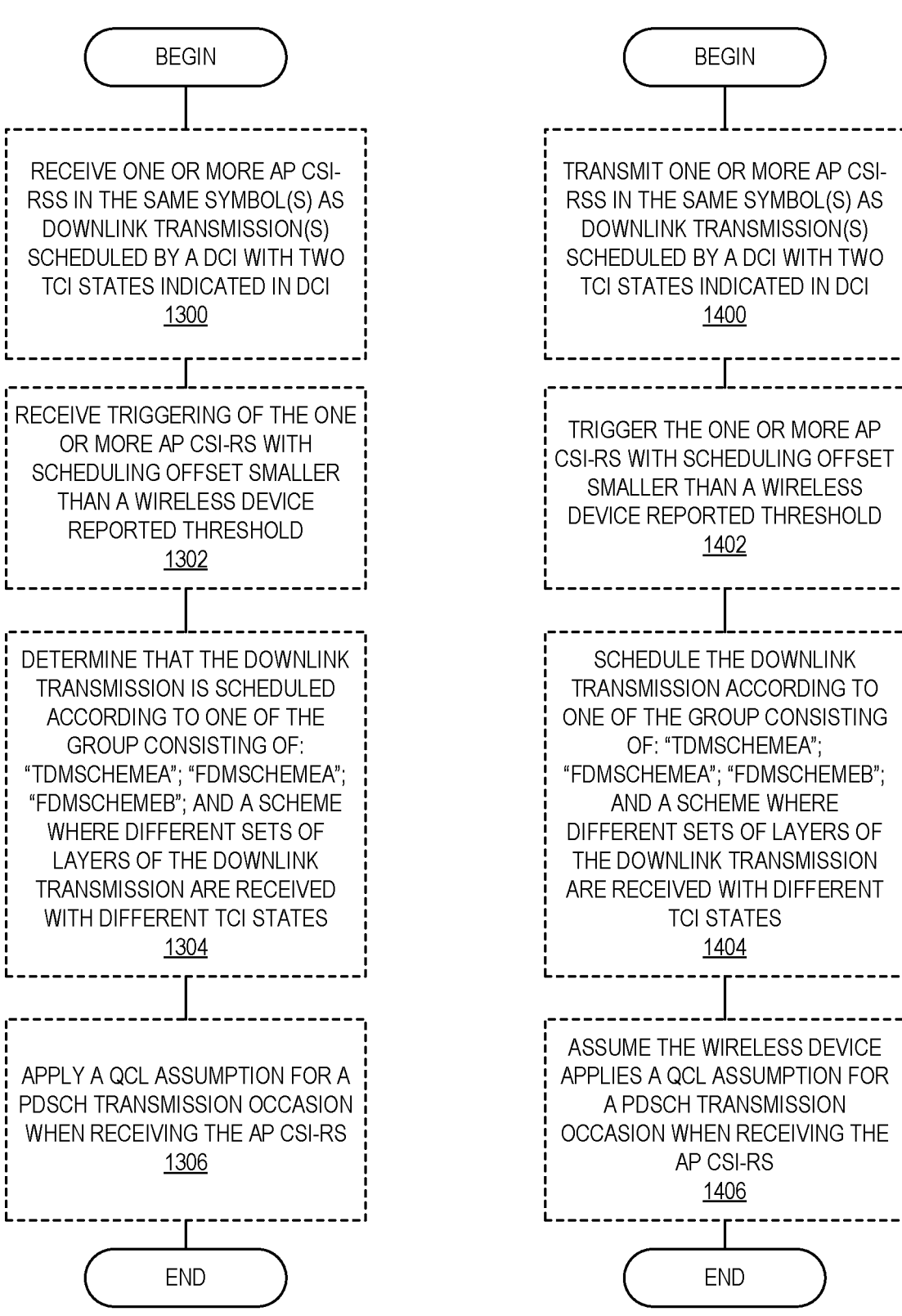
FIG. 13 illustrates a method performed by a wireless device for determining TCI states for receiving one or more AP CSI-RSs, according to some embodiments of the present disclosure.
FIG. 14 illustrates a method performed by a base station for indicating TCI states for receiving one or more AP CSI-RSs, according to some embodiments of the present disclosure.

FIG. 13 illustrates a method performed by a wireless device for determining TCI states for receiving one or more AP CSI-RSs. In some embodiments, the wireless device performs one or more of: receiving one or more AP CSI-RSs in the same symbol(s) as downlink transmission(s) scheduled by a DCI with two TCI states indicated in DCI (step 1300); receiving triggering of the one or more AP CSI-RS with scheduling offset between the last symbol of the PDCCH carrying the triggering DCI and the first symbol of the AP CSI-RS resources, where the scheduling offset is smaller than a wireless device reported threshold (step 1302); and determining that the downlink transmission is scheduled according to one of the group consisting of: "TDMSchemeA"; "FDMSchemeA"; "FDMSchemeB"; and a scheme where different sets of layers of the downlink transmission are received with different TCI states (step 1304). In some embodiments, depending on circumstances, the wireless device applies a QCL assumption for a PDSCH transmission occasion when receiving the AP CSI-RS (step 1306). In some embodiments, this defines the UE behavior (i.e., what QCL assumptions the UE makes) to receive Aperiodic CSI-RS when Aperiodic CSI-RS collides with PDSCH when the PDSCH is indicated with two TCI states. One benefit is that the proposed solution defines with which QCL properties the colliding Aperiodic CSI-RSshould be received which is previously not defined in NR. With the proposed solution Aperiodic CSI-RS can be flexibly triggered in overlapping symbols with PDSCH scheduled according to one of single-PDCCH based NC-JT scheme "FDMSchemeA", "FDMSchemeB", and "TDMSchemeA".

FIG. 14 illustrates a method performed by a base station for indicating TCI states for receiving one or more AP CSI-RSs. In some embodiments, the base station performs one or more of: transmitting, to a wireless device, one or more AP CSI-RSs in the same symbol(s) as downlink transmission(s) scheduled by a DCI with two TCI states indicated in DCI (step 1400); triggering one or more AP CSI-RS with scheduling offset between the last symbol of the PDCCH carrying the triggering DCI and the first symbol of the AP CSI-RS resources, where the scheduling offset is smaller than a wireless device reported threshold (step 1402); and scheduling the downlink transmission according to one of the group consisting of: "TDMSchemeA"; "FDMSchemeA"; "FDMSchemeB"; and a scheme where different sets of layers of the downlink transmission are received with different TCI states (step 1404). In some embodiments, depending on circumstances, the base station assumes the wireless device applies a QCL assumption for a PDSCH transmission occasion when receiving the AP CSI-RS (step 1406). In some embodiments, this defines the UE behavior (i.e., what QCL assumptions the UE makes) to receive Aperiodic CSI-RS when Aperiodic CSI-RS collides with PDSCH when the PDSCH is indicated with two TCI states. One benefit is that the proposed solution defines with which QCL properties the colliding Aperiodic CSI-RSshould be received which is previously not defined in NR. With the proposed solution Aperiodic CSI-RS can be flexibly triggered in overlapping symbols with PDSCH scheduled according to one of single-PDCCH based NC-JT scheme "FDMSchemeA", "FDMSchemeB", and "TDMSchemeA".

Embodiment 1 for scenario when AP CSI-RS collides with PDSCH scheduled according to "TDMSchemeA" and scheduling offset above a threshold.

In this embodiment, a UE is configured to receive PDSCH according to "TDMSchemeA" and is indicated with two TCI states in a DCI where the $1^{st}$ indicated TCI state is applied to PDSCH transmission occasion 1 (denoted as PDSCH1) and the $2^{nd}$ indicated TCI state is applied to PDSCH transmission occasion 2 (denoted as PDSCH2). This corresponds to the case where the scheduling offset from the last symbol of the PDCCH carrying the DCI to the first symbol of PDSCH1 is larger than or equal to the threshold timeDurationForQCL.

Figure 15:
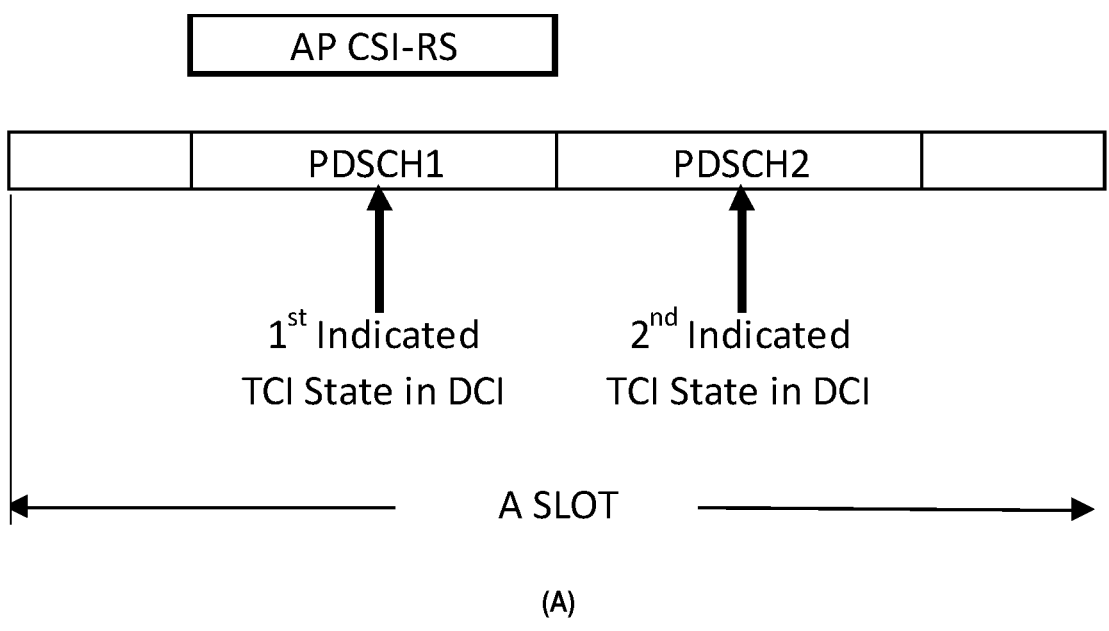
FIG. 15 illustrates an example of Embodiment 1 considering AP CSI-RS collision with PDSCH scheduled according to "TDMSchemeA", according to some embodiments of the present disclosure.
Figure 15:
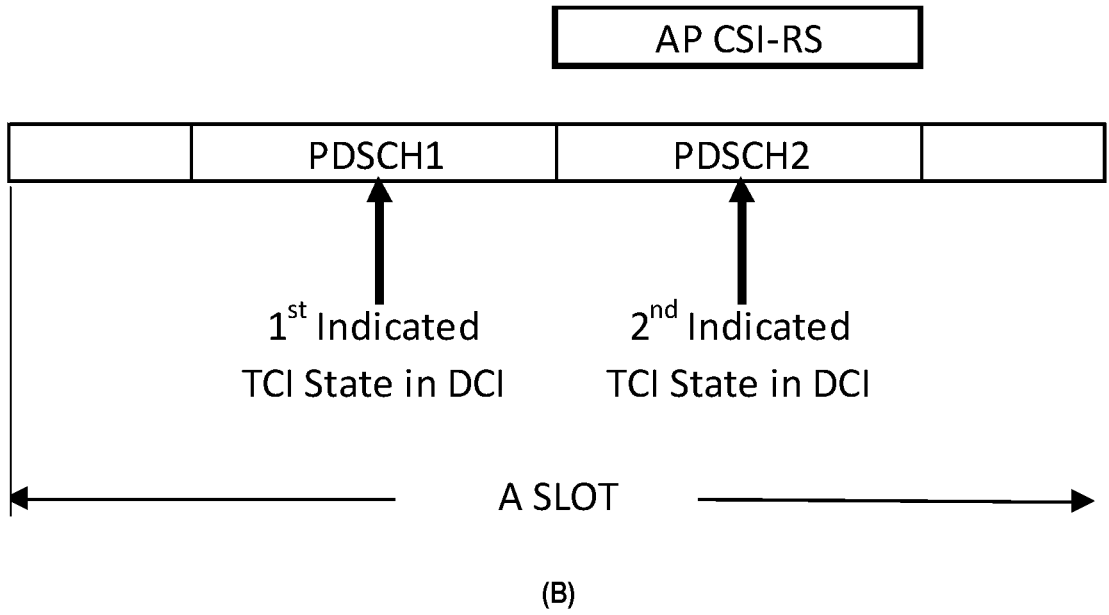

Furthermore, in this embodiment, an aperiodic CSI-RS (AP CSI-RS) is triggered to the UE by another DCI with scheduling offset between the last symbol of the PDCCH carrying the triggering DCI (i.e., the DCI that triggers the AP CSI-RS) and the first symbol of the aperiodic CSI-RS resources is smaller than the UE reported threshold beamSwitchTiming. In this case, there are two possibilities as shown in FIG. 15 which illustrates a first example of Embodiment 1 considering AP CSI-RS collision with PDSCH scheduled according to "TDMSchemeA".

As shown in FIG. 15A, when AP CSI-RS is in the same symbols as PDSCH1, the UE applies the QCL assumption of PDSCH1 (given by the $1^{st}$ indicated TCI state in DCI) when receiving the AP CSI-RS. Stated in other words, the UE receives the AP CSI-RS using the same receive beam as the one used to receive PDSCH1 whose spatial QCL properties are given by the $1^{st}$ indicated TCI state in DCI.

As shown in FIG. 15B, when AP CSI-RS is in the same symbols as PDSCH2, the UE applies the QCL assumption of PDSCH2 (given by the $2^{nd}$ indicated TCI state in DCI) when receiving the AP CSI-RS. Stated in other words, the UE receives the AP CSI-RS using the same receive beam as the one used to receive PDSCH2 whose spatial QCL properties are given by the $2^{nd}$ indicated TCI state in DCI.

Figure 16:
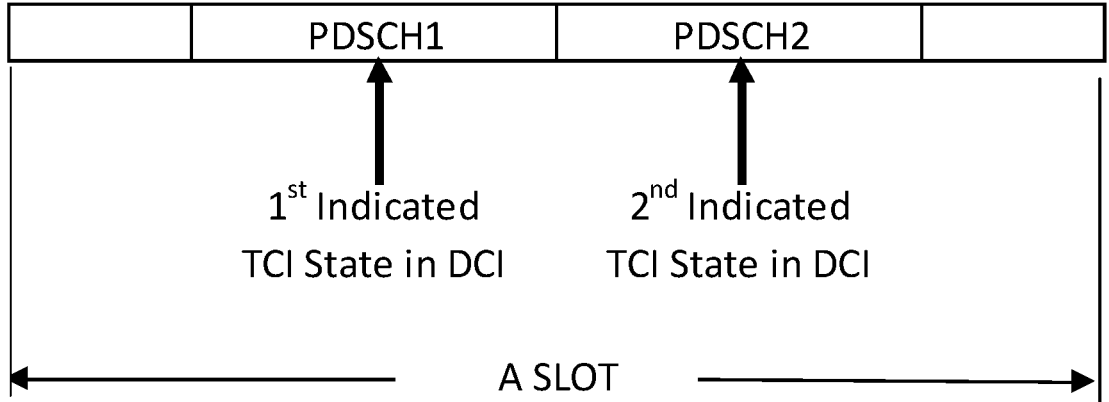
FIG. 16 illustrates a second example of Embodiment 1 considering AP CSI-RS collision with PDSCH scheduled according to "TDMSchemeA", according to some embodiments of the present disclosure.

There is also a third possibility as shown in FIG. 16 which illustrates a second example of Embodiment 1 considering AP CSI-RS collision with PDSCH scheduled according to "TDMSchemeA". As shown in the figure, in this third possibility, AP CSI-RS overlaps with the symbols of both PDSCH1 and PDSCH2. In this case, as CSI-RS of a single AP CSI-RS resource is transmitted from one TRP, it is not possible to receive CSI-RS of a single AP CSI-RS resource using two different QCL assumptions, the UE considers this as an error case and drops the AP CSI-RS (i.e., does not receive the AP CSI-RS).

Embodiment 2 for scenario when AP CSI-RS collides with PDSCH scheduled according to "TDMSchemeA" and one scheduling offset below a threshold.

In this embodiment, a UE is configured to receive PDSCH according to "TDMSchemeA" and is indicated with 2 TCI states in the DCI. In this case, the scheduling offset from the last symbol of the PDCCH to the first symbol of PDSCH1 is smaller than the threshold timeDurationForQCL but the scheduling offset from the last symbol of the PDCCH to the first symbol of PDSCH2 is larger than or equal to the threshold. In this case, the $1^{st}$ default TCI state is applied to PDSCH1 and the $2^{nd}$ indicated TCI state is applied to PDSCH2. The default TCI states for the PDSCH are given by the TCI states corresponding to the lowest codepoint among the TCI codepoints containing two different TCI states, according to the NR Rel-16 specification. Hence, $1^{st}$ default TCI state is defined as the first of the two different TCI states corresponding to the lowest such codepoint.

Figure 17:
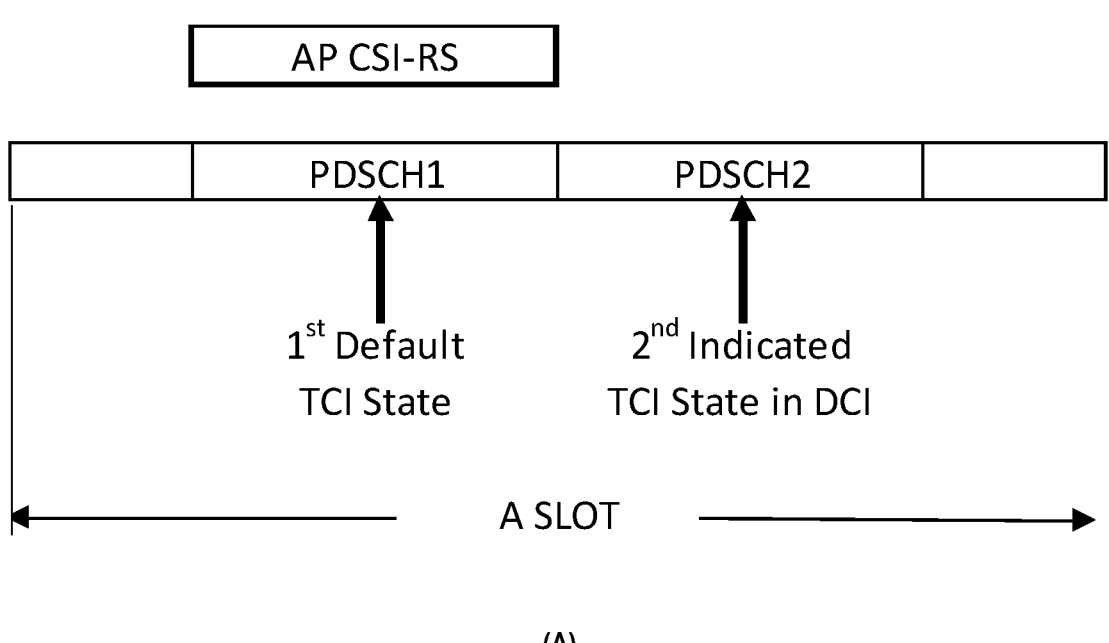
FIG. 17 illustrates a first example of Embodiment 2 considering AP CSI-RS collision with PDSCH scheduled according to "TDMSchemeA"
Figure 17:
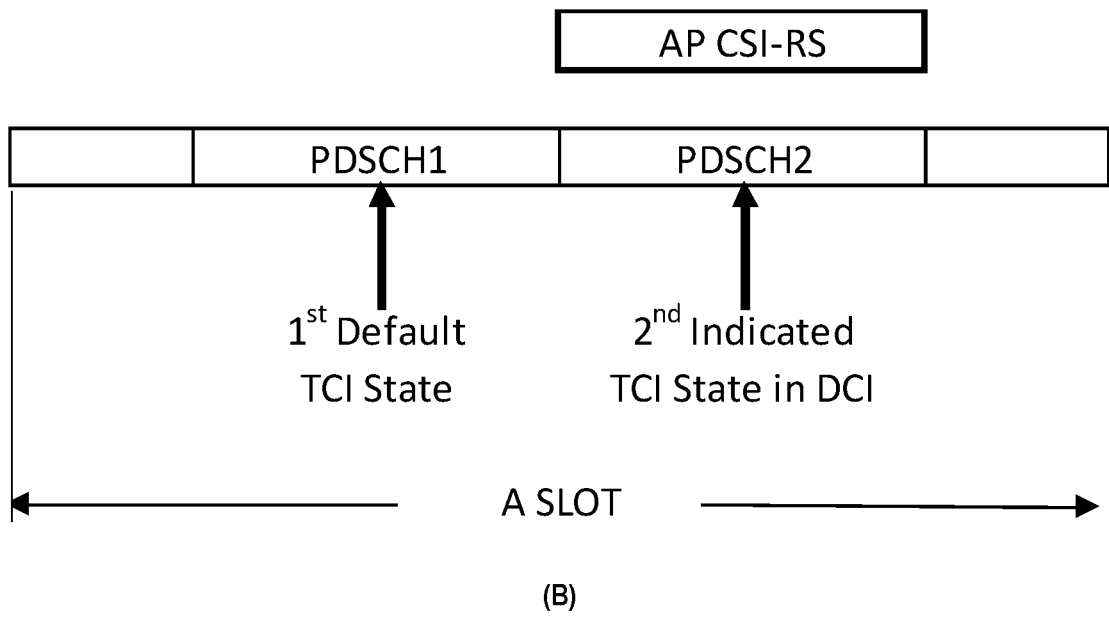

Furthermore, in this embodiment, an aperiodic CSI-RS (AP CSI-RS) is triggered to the UE by another DCI with scheduling offset between the last symbol of the PDCCH carrying the triggering DCI and the first symbol of the aperiodic CSI-RS resources is smaller than a threshold such as the UE reported threshold beamSwitchTiming. In this case, there are two possibilities as shown in FIG. 17 which illustrates a first example of Embodiment 2 considering AP CSI-RS collision with PDSCH scheduled according to "TDMSchemeA".

As shown in FIG. 17A, when AP CSI-RS is in the same symbols as PDSCH1, the UE applies the QCL assumption of PDSCH1 (given by the $1^{st}$ default TCI state) when receiving the AP CSI-RS. Stated in other words, the UE receives the AP CSI-RS using the same receive beam as the one used to receive PDSCH1 whose spatial QCL properties are given by the $1^{st}$ default TCI state.

As shown in FIG. 17B, when AP CSI-RS is in the same symbols as PDSCH2, the UE applies the QCL assumption of PDSCH2 (given by the $2^{nd}$ indicated TCI state in DCI) when receiving the AP CSI-RS. Stated in other words, the UE receives the AP CSI-RS using the same receive beam as the one used to receive PDSCH2 whose spatial QCL properties are given by the $2^{nd}$ indicated TCI state in DCI.

Figure 18:
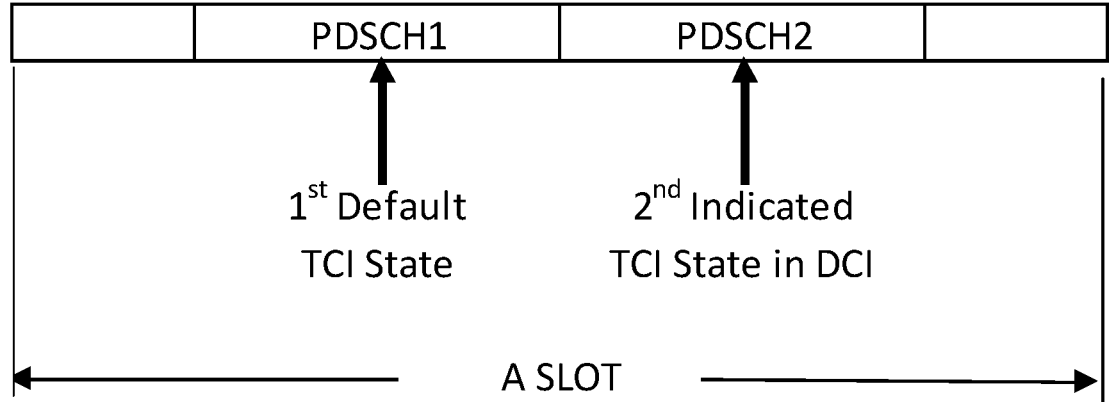
FIG. 18 illustrates a second example of Embodiment 2 considering AP CSI-RS collision with PDSCH scheduled according to "TDMSchemeA", according to some embodiments of the present disclosure.

There is also a third possibility as shown in FIG. 18 which illustrates a second example of Embodiment 2 considering AP CSI-RS collision with PDSCH scheduled according to "TDMSchemeA". As shown in the figure, in this third possibility, AP CSI-RS overlaps between the symbols of both PDSCH1 and PDSCH2. In this case, as it is not possible to receive different CSI-RS of a single AP CSI-RS resource using two different QCL assumptions, the UE drops the AP CSI-RS (i.e., does not receive the AP CSI-RS).

Embodiment 3 for scenario when AP CSI-RS collides with PDSCH scheduled according to "TDMSchemeA" and both scheduling offsets below a threshold.

In this embodiment, a UE is configured to receive PDSCH according to "TDMSchemeA" and is indicated with two TCI states in the DCI. In this case, the scheduling offset from the last symbol of the PDCCH to the first symbol of PDSCH1 is smaller than the threshold timeDurationForQCL, and/or the scheduling offset from the last symbol of the PDCCH to the first symbol of PDSCH2 is smaller than the threshold timeDurationForQCL.

In this case, the $1^{st}$ default TCI state is applied to PDSCH1 and the $2^{nd}$ default TCI state is applied to PDSCH2. The default TCI states for the PDSCH are given by the TCI states corresponding to the lowest codepoint among the TCI codepoints containing two different TCI states, according to the NR Rel-16 specification. Hence, the $1^{st}$ and $2^{nd}$ default TCI states respectively correspond to the first and the second of the two different TCI states corresponding to the lowest such codepoint.

Figure 19:
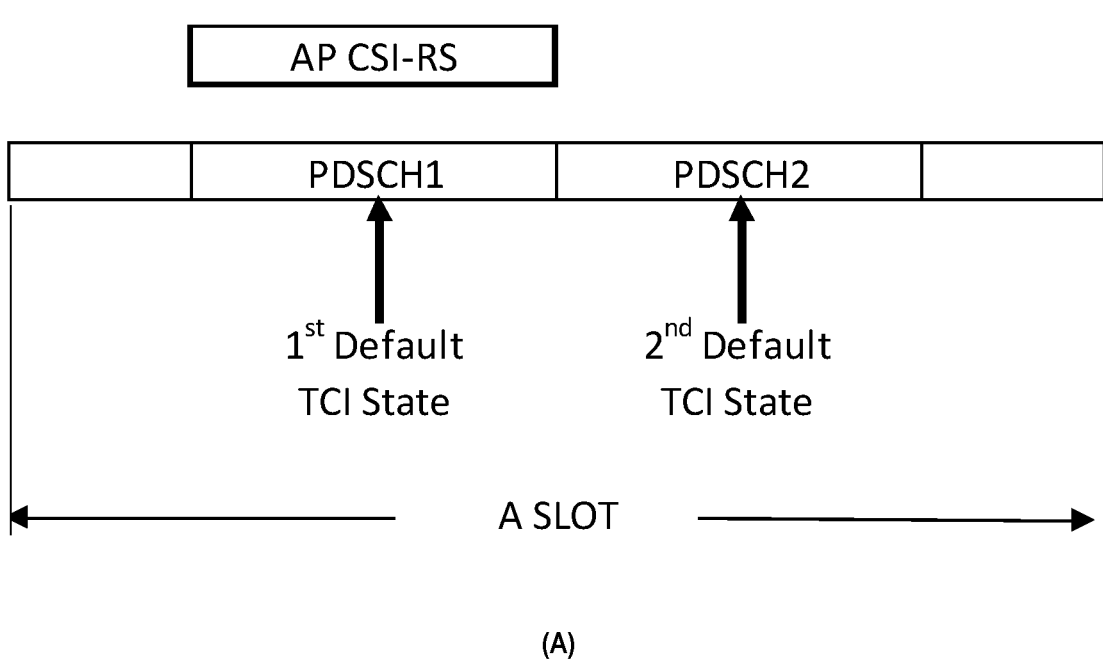
FIG. 19 illustrates a first example of Embodiment 3 considering AP CSI-RS collision with PDSCH scheduled according to "TDMSchemeA", according to some embodiments of the present disclosure.
Figure 19:
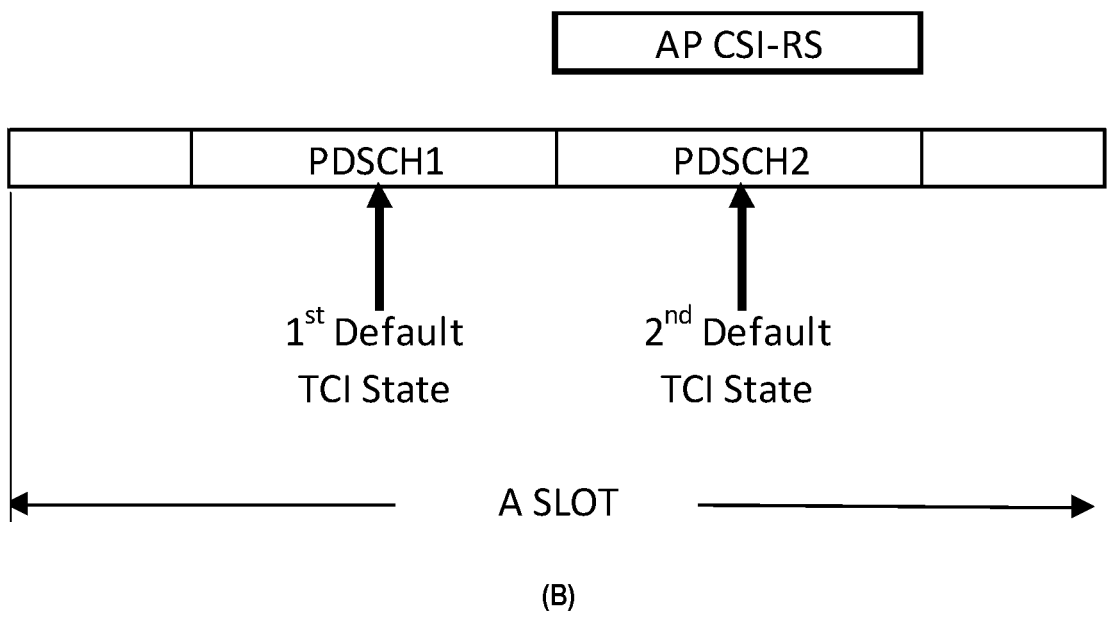

Furthermore, in this embodiment, an aperiodic CSI-RS (AP CSI-RS) is triggered to the UE with scheduling offset between the last symbol of the PDCCH carrying the triggering DCI and the first symbol of the aperiodic CSI-RS resources is smaller than the UE reported threshold beamSwitchTiming. In this case, there are two possibilities as shown in FIG. 19 which illustrates a first example of Embodiment 3 considering AP CSI-RS collision with PDSCH scheduled according to "TDMSchemeA".

As shown in FIG. 19A, when AP CSI-RS is in the same symbols as PDSCH1, the UE applies the QCL assumption of PDSCH1 (given by the $1^{st}$ default TCI state) when receiving the AP CSI-RS. Stated in other words, the UE receives the AP CSI-RS using the same receive beam as the one used to receive PDSCH1 whose spatial QCL properties are given by the $1^{st}$ default TCI state.

As shown in FIG. 19B, when AP CSI-RS is in the same symbols as PDSCH2, the UE applies the QCL assumption of PDSCH2 (given by the $2^{nd}$ default TCI state) when receiving the AP CSI-RS. Stated in other words, the UE receives the AP CSI-RS using the same receive beam as the one used to receive PDSCH2 whose spatial QCL properties are given by the $2^{nd}$ default TCI state.

Figure 20:
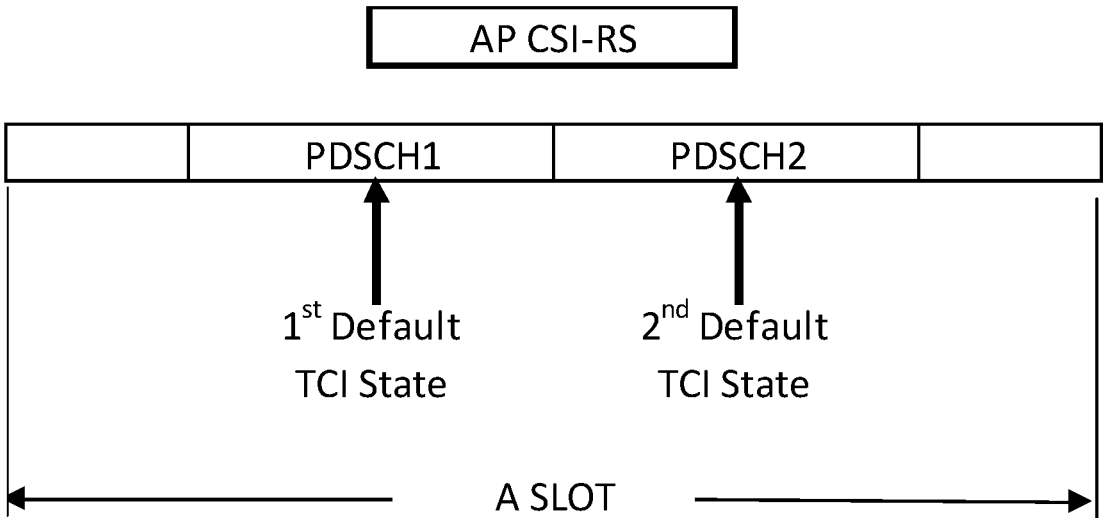
FIG. 20 illustrates a second example of Embodiment 3 considering AP CSI-RS collision with PDSCH scheduled according to "TDMSchemeA", according to some embodiments of the present disclosure.

There is also a third possibility as shown in FIG. 20 which illustrates a second example of Embodiment 3 considering AP CSI-RS collision with PDSCH scheduled according to "TDMSchemeA". As shown in the figure, in this third possibility, AP CSI-RS overlaps between the symbols of both PDSCH1 and PDSCH2. In this case, as it is not possible to receive different CSI-RS of a single AP CSI-RS resource using two different QCL assumptions, the UE drops the AP CSI-RS (i.e., does not receive the AP CSI-RS).

Embodiment 4 for scenario when AP CSI-RS collides with PDSCH scheduled according to single-PDCCH based NC-JT scheme and scheduling offset above a threshold.

In this embodiment, a UE is configured to receive PDSCH according to single-PDCCH based NC-JT scheme and is indicated with two TCI states in the DCI where the two indicated TCI states are used to receive different sets of layers corresponding to the PDSCH (i.e., first set of layers correspond to $1^{st}$ TCI state and second set of layers correspond to $2^{nd}$ TCI state). This corresponds to the case where the scheduling offset from the last symbol of the PDCCH to the first symbol of the PDSCH is larger than or equal to the threshold timeDurationForQCL.

Figures 21, 22:
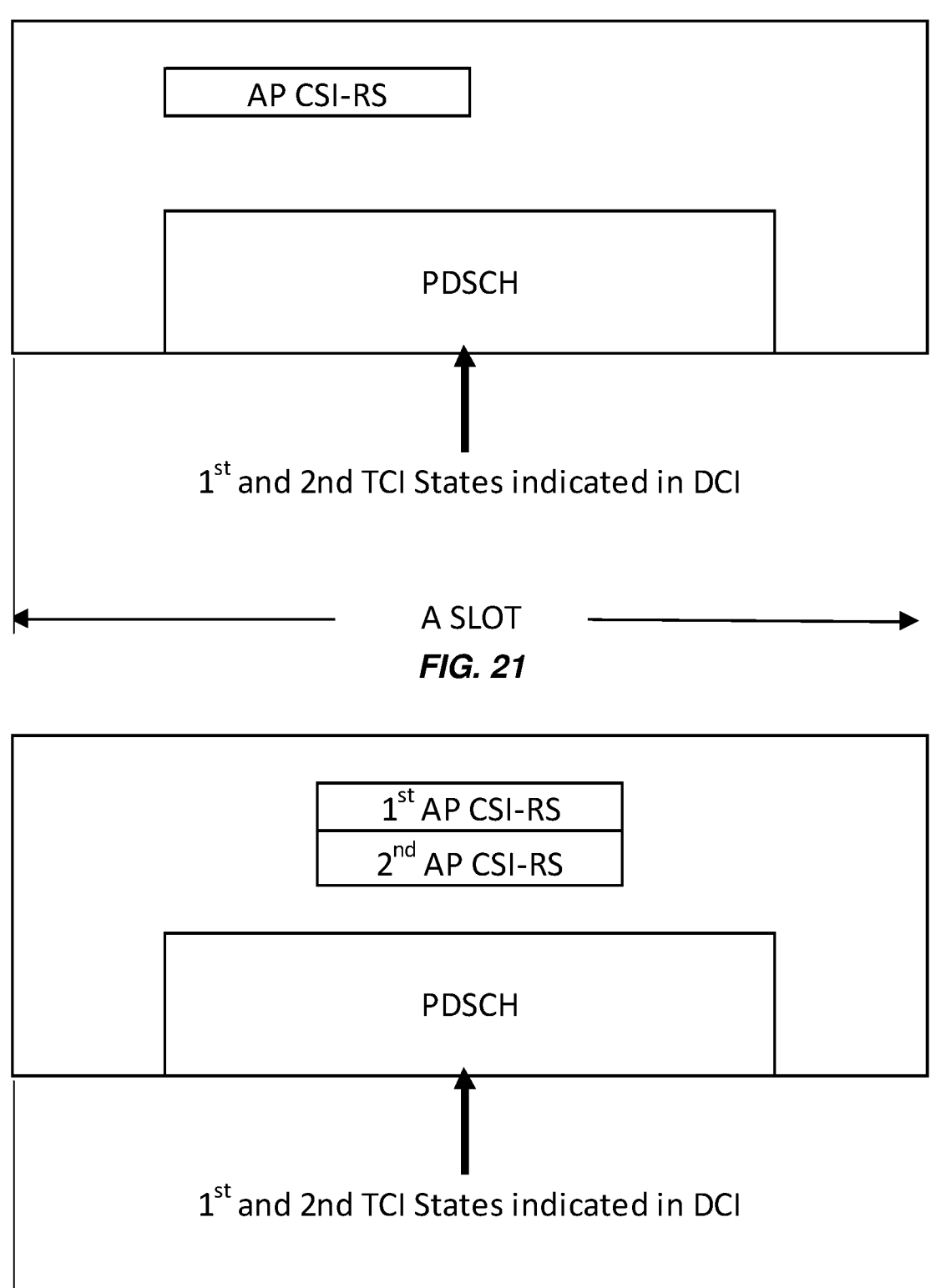
FIG. 21 illustrates a first example of Embodiment 4 considering AP CSI-RS collision with PDSCH scheduled according to single-PDCCH based NC-JT scheme, where the $1^{st}$ TCI state is assumed for the AP CSI-RS, according to some embodiments of the present disclosure.
FIG. 22 illustrates a second example of Embodiment 4 considering AP CSI-RS collision with PDSCH scheduled according to single-PDCCH based NC-JT scheme, where the $1^{st}$ and $2^{nd}$ TCI states are assumed for the $1^{st}$ and $2^{nd}$ AP CSI-RS, respectively, according to some embodiments of the present disclosure.

Furthermore, in one case, an aperiodic CSI-RS (AP CSI-RS) is triggered to the UE by another DCI with scheduling offset between the last symbol of the PDCCH carrying the triggering DCI and the first symbol of the aperiodic CSI-RS resources is smaller than the UE reported threshold beamSwitchTiming. FIG. 21 illustrates a first example of Embodiment 4 considering AP CSI-RS collision with PDSCH scheduled according to single-PDCCH based NC-JT scheme, where the $1^{st}$ TCI state is assumed for the AP CSI-RS. The aperiodic CSI-RS overlaps with the PDSCH symbols as shown in FIG. 21.

In this case, when AP CSI-RS is in the same symbols as PDSCH as shown in FIG. 21, the UE applies the QCL assumption given by the $1^{st}$ indicated TCI state in DCI for the PDSCH when receiving the AP CSI-RS. Stated in other words, the UE receives the AP CSI-RS using the same receive beam as the one used to receive PDSCH whose spatial QCL properties are given by the $1^{st}$ indicated TCI state in DCI.

In a second case, two AP CSI-RSs (e.g., each AP CSI-RS transmitted from a different TRP) are triggered to the UE with scheduling offset between the last symbol of the PDCCH carrying the triggering DCI and the first symbol(s) of the aperiodic CSI-RS resources is smaller than the UE reported threshold beamSwitchTiming. FIG. 22 illustrates a second example of Embodiment 4 considering AP CSI-RS collision with PDSCH scheduled according to single-PDCCH based NC-JT scheme, where the $1^{st}$ and $2^{nd}$ TCI states are assumed for the $1^{st}$ and $2^{nd}$AP CSI-RS, respectively. The two aperiodic CSI-RSs overlap with the PDSCH symbols as shown in FIG. 22.

In this case, for the $1^{st}$ AP CSI-RS, the UE applies the QCL assumption given by the $1^{st}$ indicated TCI state in DCI for the PDSCH when receiving the $1^{st}$ AP CSI-RS. Stated in other words, the UE receives the $1^{st}$ AP CSI-RS using the same receive beam as the one used to receive PDSCH whose spatial QCL properties are given by the 1st indicated TCI state in DCI.

For the $2^{nd}$AP CSI-RS, the UE applies the QCL assumption given by the $2^{nd}$ indicated TCI state in DCI for the PDSCH when receiving the $2^{nd}$AP CSI-RS. Stated in other words, the UE receives the $2^{nd}$ AP CSI-RS using the same receive beam as the one used to receive PDSCH whose spatial QCL properties are given by the $2^{nd}$ indicated TCI state in DCI.

The $1^{st}$ and $2^{nd}$AP CSI-RS resources are defined using either the CSI-RS resource IDs or CSI-RS resource set IDs (i.e., NZP-CSI-RS-ResourceSetId) to which the AP CSI-RS resources belong to. For instance, if the two AP CSI-RS resources are in different CSI-RS resource set IDs, then the AP CSI-RS resource with the smallest NZP-CSI-RS-ResourceSetId is the $1^{st}$ AP CSI-RS resource and the AP CSI-RS resource with the largest NZP-CSI-RS-ResourceSetId is the $2^{nd}$AP CSI-RS resource. Similar definition of $1^{st}$ and $2^{nd}$ AP CSI-RS resource can be achieved by using CSI-RS resource IDs in place of CSI-RS resource set IDs.

Although this embodiment is written from the perspective of PDSCH scheduled according to single-PDCCH based NC-JT scheme it can be easily extended to PDSCH scheduled via either "FDMSchemeA" or "FDMSchemeB".

Embodiment 5 for scenario when AP CSI-RS collides with PDSCH scheduled according to single-PDCCH based NC-JT scheme and scheduling offset below a threshold.

In this embodiment, a UE is configured to receive PDSCH according to single-PDCCH based NC-JT scheme and is indicated with 2 TCI states in the DCI where the 2 default TCI states are used to receive different layers corresponding to the PDSCH. This corresponds to the case where the scheduling offset from the last symbol of the PDCCH to the first symbol of the PDSCH is smaller than the threshold timeDurationForQCL. The default TCI states for the PDSCH are given by the TCI states corresponding to the lowest codepoint among the TCI codepoints containing two different TCI states, according to the NR Rel-16 specification.

Figures 23, 24:
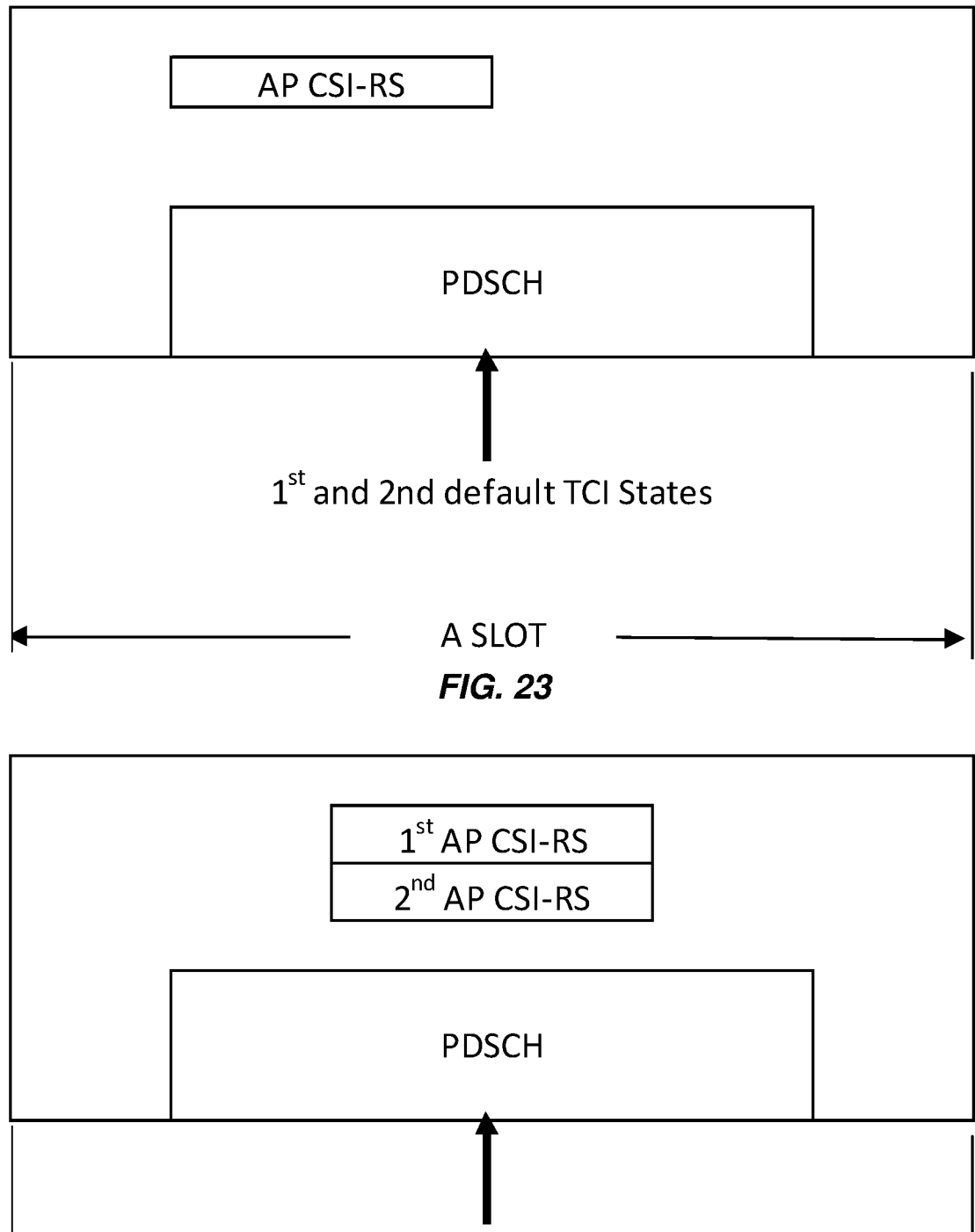
FIG. 23 illustrates a first example of Embodiment 5 considering AP CSI-RS collision with PDSCH scheduled according to single-PDCCH based NC-JT scheme, where the $1^{st}$ default TCI state is assumed for the AP CSI-RS, according to some embodiments of the present disclosure.
FIG. 24 illustrates a second example of Embodiment 5 considering AP CSI-RS collision with PDSCH scheduled according to single-PDCCH based NC-JT scheme, where the $1^{st}$ and $2^{nd}$ default TCI states are assumed for the $1^{st}$ and $2^{nd}$ AP CSI-RS, respectively, according to some embodiments of the present disclosure.

Furthermore, in one case, an Aperiodic CSI-RS (AP CSI-RS) is triggered to the UE with scheduling offset between the last symbol of the PDCCH carrying the triggering DCI and the first symbol of the aperiodic CSI-RS resources is smaller than the UE reported threshold beamSwitchTiming. FIG. 23 illustrates a first example of Embodiment 5 considering AP CSI-RS collision with PDSCH scheduled according to single-PDCCH based NC-JT scheme, where the $1^{st}$ default TCI state is assumed for the AP CSI-RS. The aperiodic CSI-RS overlaps with the PDSCH symbols as shown in FIG. 23.

In this case, when AP CSI-RS is in the same symbols as PDSCH as shown in FIG. 23, the UE applies the QCL assumption given by the 1st default TCI state in DCI for the PDSCH when receiving the AP CSI-RS. Stated in other words, the UE receives the AP CSI-RS using the same receive beam as the one used to receive PDSCH whose spatial QCL properties are given by the 1st default TCI state.

In a second case, two AP CSI-RSs (e.g., each AP CSI-RS transmitted from a different TRP) are triggered to the UE with scheduling offset between the last symbol of the PDCCH carrying the triggering DCI and the first symbol(s) of the aperiodic CSI-RS resources is smaller than the UE reported threshold beamSwitchTiming. FIG. 24 illustrates a second example of Embodiment 5 considering AP CSI-RS collision with PDSCH scheduled according to single-PDCCH based NC-JT scheme, where the $1^{st}$ and $2^{nd}$ default TCI states are assumed for the $1^{st}$ and $2^{nd}$AP CSI-RS, respectively. The two aperiodic CSI-RSs overlap with the PDSCH symbols as shown in FIG. 24.

In this case, for the $1^{st}$ AP CSI-RS, the UE applies the QCL assumption given by the $1^{st}$ default TCI state for the PDSCH when receiving the $1^{st}$ AP CSI-RS. Stated in other words, the UE receives the $1^{st}$ AP CSI-RS using the same receive beam as the one used to receive PDSCH whose spatial QCL properties are given by the $1^{st}$ default TCI state in DCI.

For the $2^{nd}$ AP CSI-RS, the UE applies the QCL assumption given by the $2^{nd}$ default TCI state for the PDSCH when receiving the $2^{nd}$ AP CSI-RS. Stated in other words, the UE receives the $2^{nd}$ AP CSI-RS using the same receive beam as the one used to receive PDSCH whose spatial QCL properties are given by the $2^{nd}$ indicated TCI state in DCI.

The $1^{st}$ and $2^{nd}$ AP CSI-RS resources are defined using either the CSI-RS resource IDs or CSI-RS resource set IDs (i.e., NZP-CSI-RS-ResourceSetId) to which the AP CSI-RS resources belong to. For instance, if the two AP CSI-RS resources are in different CSI-RS resource set IDs, then the AP CSI-RS resource with the smallest NZP-CSI-RS-ResourceSetId is the $1^{st}$ AP CSI-RS resource and the AP CSI-RS resource with the largest NZP-CSI-RS-ResourceSetId is the $2^{nd}$ AP CSI-RS resource. Similar definition of $1^{st}$ and $2^{nd}$ AP CSI-RS resource can be achieved by using CSI-RS resource IDs in place of CSI-RS resource set IDs.

Although this embodiment is written from the perspective of PDSCH scheduled according to single-PDCCH based NC-JT scheme it can be easily extended to PDSCH scheduled via either "FDMSchemeA" or "FDMSchemeB".

Figure 25:
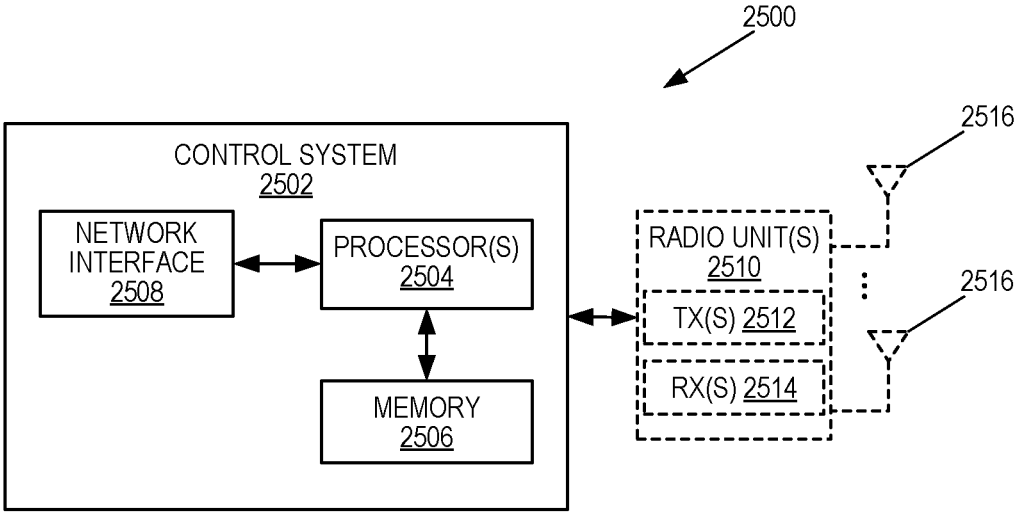
FIG. 25 is a schematic block diagram of a radio access node according to some embodiments of the present disclosure.

FIG. 25 is a schematic block diagram of a radio access node 2500 according to some embodiments of the present disclosure. Optional features are represented by dashed boxes. The radio access node 2500 may be, for example, a base station 402 or 406 or a network node that implements all or part of the functionality of the base station 402 or gNB described herein. As illustrated, the radio access node 2500 includes a control system 2502 that includes one or more processors 2504 (e.g., Central Processing Units (CPUs), Application Specific Integrated Circuits (ASICs), Field Programmable Gate Arrays (FPGAs), and/or the like), memory 2506, and a network interface 2508. The one or more processors 2504 are also referred to herein as processing circuitry. In addition, the radio access node 2500 may include one or more radio units 2510 that each includes one or more transmitters 2512 and one or more receivers 2514 coupled to one or more antennas 2516. The radio units 2510 may be referred to or be part of radio interface circuitry. In some embodiments, the radio unit(s) 2510 is external to the control system 2502 and connected to the control system 2502 via, e.g., a wired connection (e.g., an optical cable). However, in some other embodiments, the radio unit(s) 2510 and potentially the antenna(s) 2516 are integrated together with the control system 2502. The one or more processors 2504 operate to provide one or more functions of a radio access node 2500 as described herein. In some embodiments, the function(s) are implemented in software that is stored, e.g., in the memory 2506 and executed by the one or more processors 2504.

Figure 26:
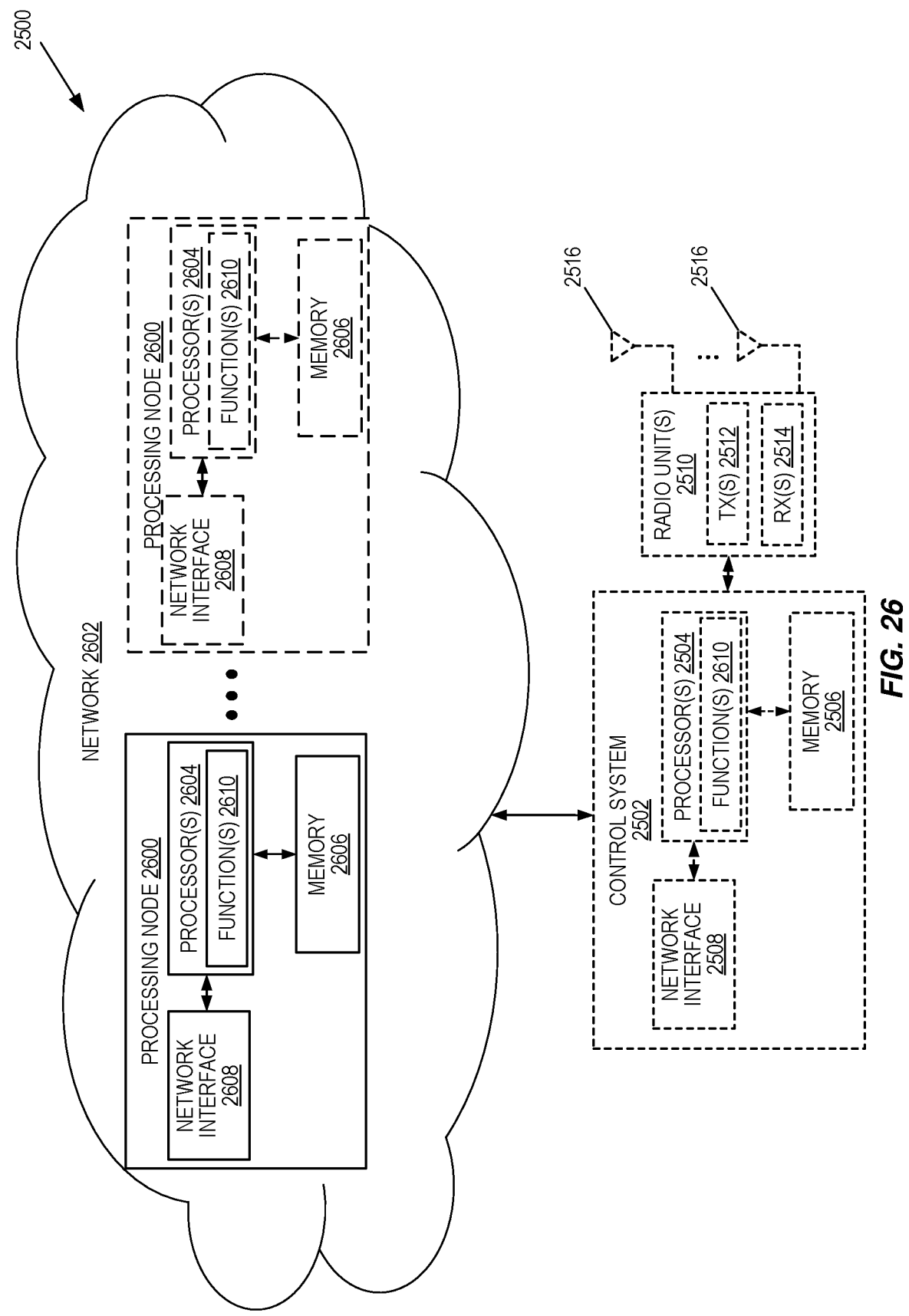
FIG. 26 is a schematic block diagram that illustrates a virtualized embodiment of the radio access node according to some embodiments of the present disclosure.

FIG. 26 is a schematic block diagram that illustrates a virtualized embodiment of the radio access node 2500 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 2500 in which at least a portion of the functionality of the radio access node 2500 is implemented as a virtual component(s) (e.g., via a virtual machine(s) executing on a physical processing node (s) in a network(s)). As illustrated, in this example, the radio access node 2500 may include the control system 2502 and/or the one or more radio units 2510, as described above. The control system 2502 may be connected to the radio unit(s) 2510 via, for example, an optical cable or the like. The radio access node 2500 includes one or more processing nodes 2600 coupled to or included as part of a network(s) 2602. If present, the control system 2502 or the radio unit(s) is connected to the processing node(s) 2600 via the network 2602. Each processing node 2600 includes one or more processors 2604 (e.g., CPUs, ASICs, FPGAs, and/or the like), memory 2606, and a network interface 2608.

In this example, functions 2610 of the radio access node 2500 described herein are implemented at the one or more processing nodes 2600 or distributed across the one or more processing nodes 2600 and the control system 2502 and/or the radio unit(s) 2510 in any desired manner. In some particular embodiments, some or all of the functions 2610 of the radio access node 2500 described herein are implemented as virtual components executed by one or more virtual machines implemented in a virtual environment(s) hosted by the processing node(s) 2600. As will be appreciated by one of ordinary skill in the art, additional signaling or communication between the processing node(s) 2600 and the control system 2502 is used in order to carry out at least some of the desired functions 2610. Notably, in some embodiments, the control system 2502 may not be included, in which case the radio unit(s) 2510 communicates directly with the processing node(s) 2600 via an appropriate network interface(s).

In some embodiments, a computer program including instructions which, when executed by at least one processor, causes the at least one processor to carry out the functionality of radio access node 2500 or a node (e.g., a processing node 2600) implementing one or more of the functions 2610 of the radio access node 2500 in a virtual environment according to any of the embodiments described herein is provided.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 27:
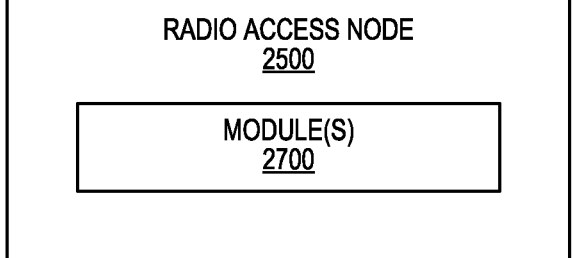
FIG. 27 is a schematic block diagram of the radio access node according to some other embodiments of the present disclosure.

FIG. 27 is a schematic block diagram of the radio access node 2500 according to some other embodiments of the present disclosure. The radio access node 2500 includes one or more modules 2700, each of which is implemented in software. The module(s) 2700 provide the functionality of the radio access node 2500 described herein. This discussion is equally applicable to the processing node 2600 of FIG. 26 where the modules 2700 may be implemented at one of the processing nodes 2600 or distributed across multiple processing nodes 2600 and/or distributed across the processing node(s) 2600 and the control system 2502.

Figure 28:
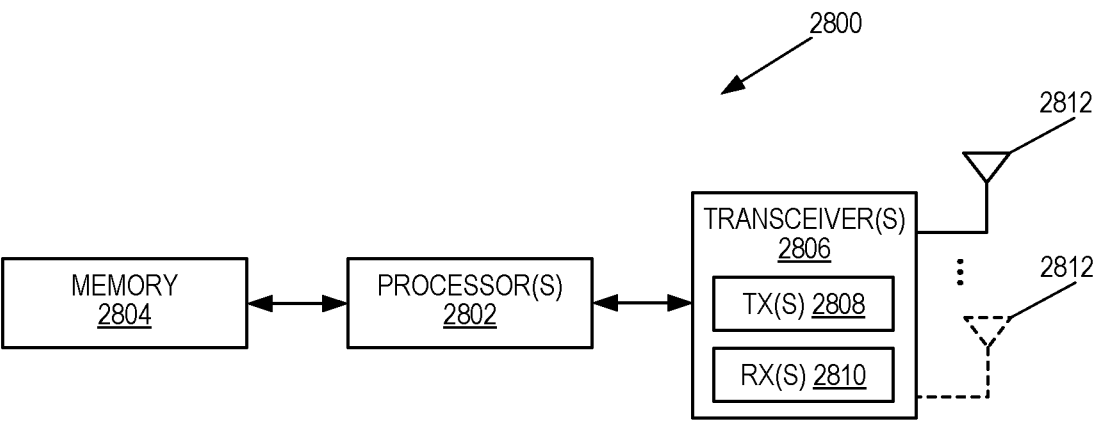
FIG. 28 is a schematic block diagram of a wireless communication device according to some embodiments of the present disclosure.

FIG. 28 is a schematic block diagram of a wireless communication device 2800 according to some embodiments of the present disclosure. As illustrated, the wireless communication device 2800 includes one or more processors 2802 (e.g., CPUs, ASICs, FPGAs, and/or the like), memory 2804, and one or more transceivers 2806 each including one or more transmitters 2808 and one or more receivers 2810 coupled to one or more antennas 2812. The transceiver(s) 2806 includes radio-front end circuitry connected to the antenna(s) 2812 that is configured to condition signals communicated between the antenna(s) 2812 and the processor(s) 2802, as will be appreciated by on of ordinary skill in the art. The processors 2802 are also referred to herein as processing circuitry. The transceivers 2806 are also referred to herein as radio circuitry. In some embodiments, the functionality of the wireless communication device 2800 described above may be fully or partially implemented in software that is, e.g., stored in the memory 2804 and executed by the processor(s) 2802. Note that the wireless communication device 2800 may include additional components not illustrated in FIG. 28 such as, e.g., one or more user interface components (e.g., an input/output interface including a display, buttons, a touch screen, a microphone, a speaker(s), and/or the like and/or any other components for allowing input of information into the wireless communication device 2800 and/or allowing output of information from the wireless communication device 2800), a power supply (e.g., a battery and associated power circuitry), etc.

In some embodiments, a computer program including instructions which, when executed by at least one processor, causes the at least one processor to carry out the functionality of the wireless communication device 2800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 29:
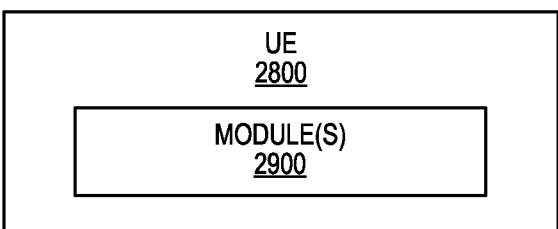
FIG. 29 is a schematic block diagram of the wireless communication device according to some other embodiments of the present disclosure.

FIG. 29 is a schematic block diagram of the wireless communication device 2800 according to some other embodiments of the present disclosure. The wireless communication device 2800 includes one or more modules 2900, each of which is implemented in software. The module(s) 2900 provide the functionality of the wireless communication device 2800 described herein.

Figure 30:
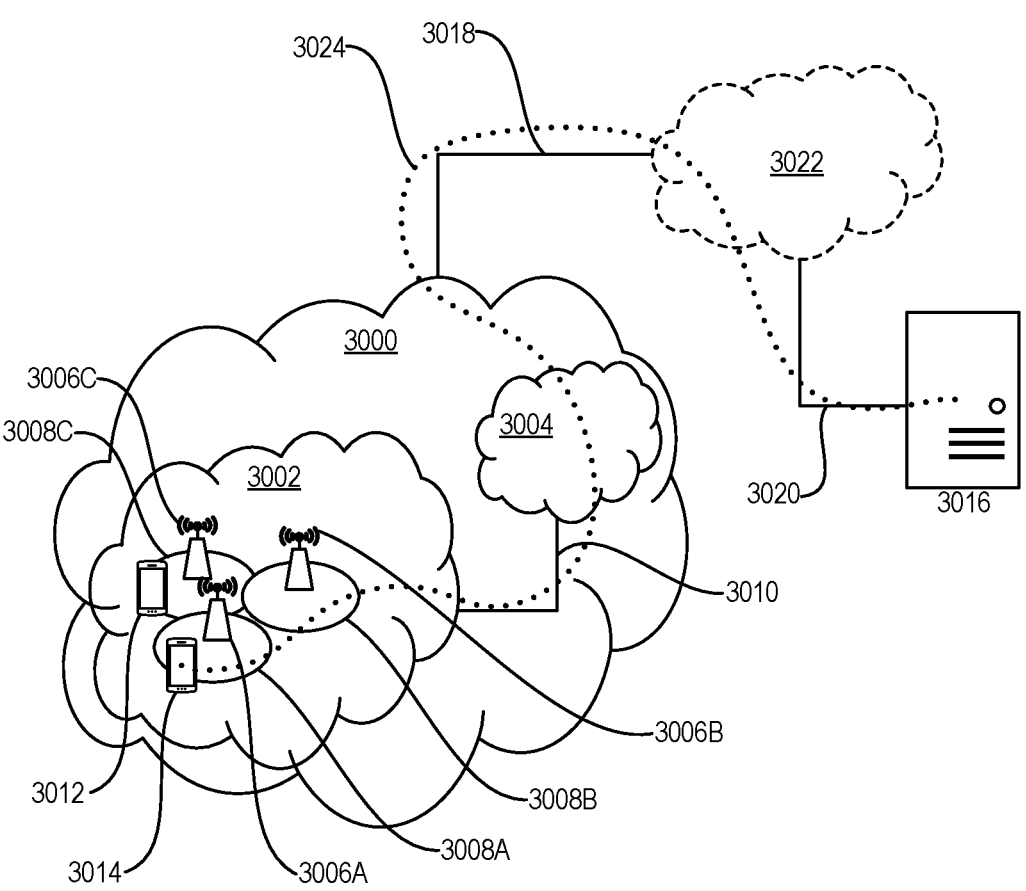
FIG. 30, in accordance with an embodiment, a communication system includes a telecommunication network, such as a 3GPP-type cellular network, which comprises an access network, such as a RAN, and a core network according to some other embodiments of the present disclosure.

With reference to FIG. 30, in accordance with an embodiment, a communication system includes a telecommunication network 3000, such as a 3GPP-type cellular network, which comprises an access network 3002, such as a RAN, and a core network 3004. The access network 3002 comprises a plurality of base stations 3006A, 3006B, 3006C, such as Node Bs, eNBs, gNBs, or other types of wireless Access Points (APs), each defining a corresponding coverage area 3008A, 3008B, 3008C. Each base station 3006A, 3006B, 3006C is connectable to the core network 3004 over a wired or wireless connection 3010. A first UE 3012 located in coverage area 3008C is configured to wirelessly connect to, or be paged by, the corresponding base station 3006C. A second UE 3014 in coverage area 3008A is wirelessly connectable to the corresponding base station 3006A. While a plurality of UEs 3012, 3014 are illustrated in this example, the disclosed embodiments are equally applicable to a situation where a sole UE is in the coverage area or where a sole UE is connecting to the corresponding base station 3006.

The telecommunication network 3000 is itself connected to a host computer 3016, which may be embodied in the hardware and/or software of a standalone server, a cloud-implemented server, a distributed server, or as processing resources in a server farm. The host computer 3016 may be under the ownership or control of a service provider, or may be operated by the service provider or on behalf of the service provider. Connections 3018 and 3020 between the telecommunication network 3000 and the host computer 3016 may extend directly from the core network 3004 to the host computer 3016 or may go via an optional intermediate network 3022. The intermediate network 3022 may be one of, or a combination of more than one of, a public, private, or hosted network; the intermediate network 3022, if any, may be a backbone network or the Internet; in particular, the intermediate network 3022 may comprise two or more sub-networks (not shown).

The communication system of FIG. 30 as a whole enables connectivity between the connected UEs 3012, 3014 and the host computer 3016. The connectivity may be described as an Over-the-Top (OTT) connection 3024. The host computer 3016 and the connected UEs 3012, 3014 are configured to communicate data and/or signaling via the OTT connection 3024, using the access network 3002, the core network 3004, any intermediate network 3022, and possible further infrastructure (not shown) as intermediaries. The OTT connection 3024 may be transparent in the sense that the participating communication devices through which the OTT connection 3024 passes are unaware of routing of uplink and downlink communications. For example, the base station 3006 may not or need not be informed about the past routing of an incoming downlink communication with data originating from the host computer 3016 to be forwarded (e.g., handed over) to a connected UE 3012. Similarly, the base station 3006 need not be aware of the future routing of an outgoing uplink communication originating from the UE 3012 towards the host computer 3016.

Example implementations, in accordance with an embodiment, of the UE, base station, and host computer discussed in the preceding paragraphs will now be described with reference to FIG. 31. In a communication system 3100, a host computer 3102 comprises hardware 3104 including a communication interface 3106 configured to set up and maintain a wired or wireless connection with an interface of a different communication device of the communication system 3100. The host computer 3102 further comprises processing circuitry 3108, which may have storage and/or processing capabilities. In particular, the processing circuitry 3108 may comprise one or more programmable processors, ASICs, FPGAs, or combinations of these (not shown) adapted to execute instructions. The host computer 3102 further comprises software 3110, which is stored in or accessible by the host computer 3102 and executable by the processing circuitry 3108. The software 3110 includes a host application 3112. The host application 3112 may be operable to provide a service to a remote user, such as a UE 3114 connecting via an OTT connection 3116 terminating at the UE 3114 and the host computer 3102. In providing the service to the remote user, the host application 3112 may provide user data which is transmitted using the OTT connection 3116.

The communication system 3100 further includes a base station 3118 provided in a telecommunication system and comprising hardware 3120 enabling it to communicate with the host computer 3102 and with the UE 3114. The hardware 3120 may include a communication interface 3122 for setting up and maintaining a wired or wireless connection with an interface of a different communication device of the communication system 3100, as well as a radio interface 3124 for setting up and maintaining at least a wireless connection 3126 with the UE 3114 located in a coverage area (not shown in FIG. 31) served by the base station 3118. The communication interface 3122 may be configured to facilitate a connection 3128 to the host computer 3102. The connection 3128 may be direct or it may pass through a core network (not shown in FIG. 31) of the telecommunication system and/or through one or more intermediate networks outside the telecommunication system. In the embodiment shown, the hardware 3120 of the base station 3118 further includes processing circuitry 3130, which may comprise one or more programmable processors, ASICs, FPGAs, or combinations of these (not shown) adapted to execute instructions. The base station 3118 further has software 3132 stored internally or accessible via an external connection.

The communication system 3100 further includes the UE 3114 already referred to. The UE's 3114 hardware 3134 may include a radio interface 3136 configured to set up and maintain a wireless connection 3126 with a base station serving a coverage area in which the UE 3114 is currently located. The hardware 3134 of the UE 3114 further includes processing circuitry 3138, which may comprise one or more programmable processors, ASICs, FPGAs, or combinations of these (not shown) adapted to execute instructions. The UE 3114 further comprises software 3140, which is stored in or accessible by the UE 3114 and executable by the processing circuitry 3138. The software 3140 includes a client application 3142. The client application 3142 may be operable to provide a service to a human or non-human user via the UE 3114, with the support of the host computer 3102. In the host computer 3102, the executing host application 3112 may communicate with the executing client application 3142 via the OTT connection 3116 terminating at the UE 3114 and the host computer 3102. In providing the service to the user, the client application 3142 may receive request data from the host application 3112 and provide user data in response to the request data. The OTT connection 3116 may transfer both the request data and the user data. The client application 3142 may interact with the user to generate the user data that it provides.

Figure 31:
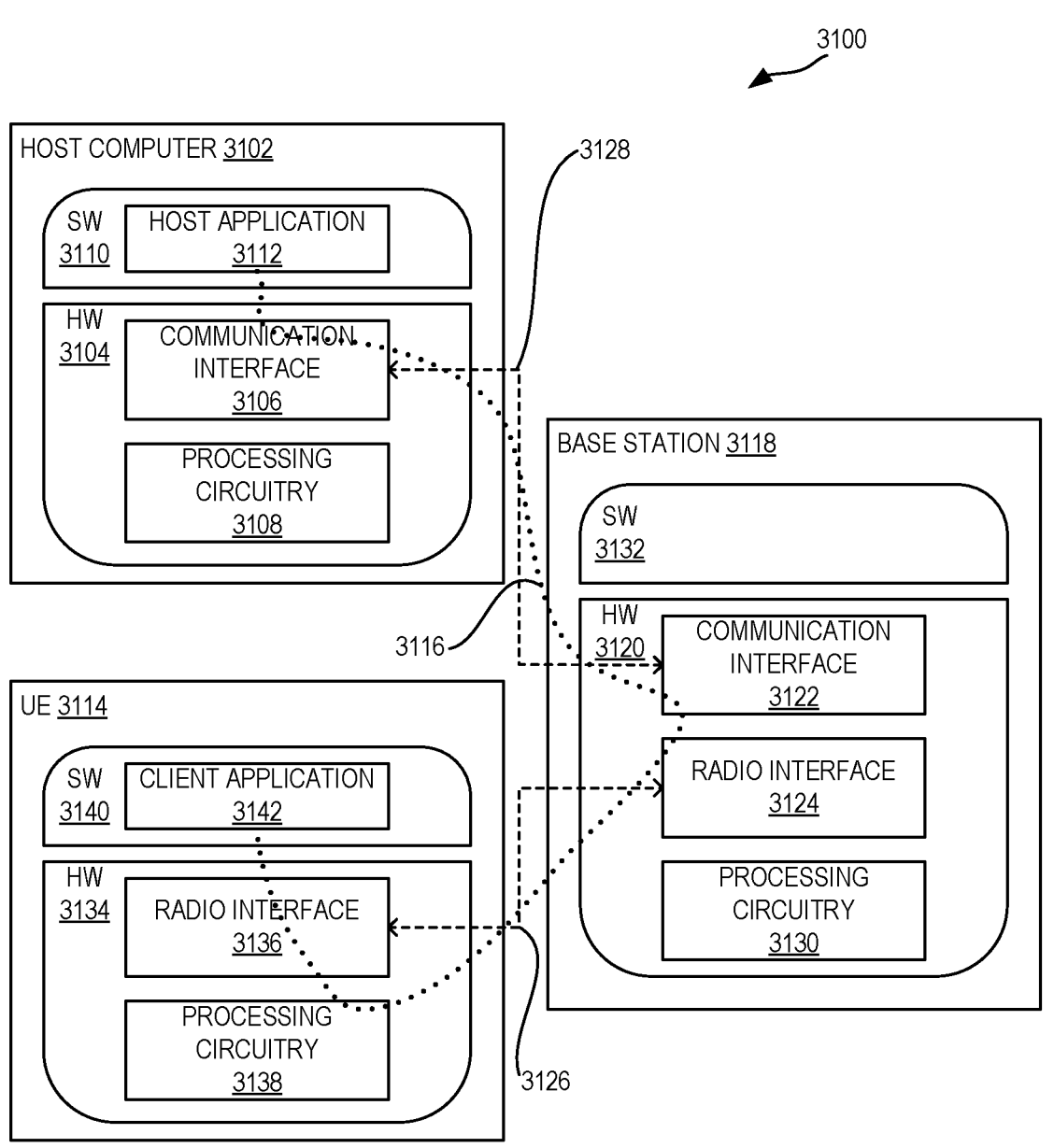
FIG. 31 illustrates an example implementation, in accordance with an embodiment, of the UE, base station, and host computer according to some other embodiments of the present disclosure.

It is noted that the host computer 3102, the base station 3118, and the UE 3114 illustrated in FIG. 31 may be similar or identical to the host computer 3016, one of the base stations 3006A, 3006B, 3006C, and one of the UEs 3012, 3014 of FIG. 30, respectively. This is to say, the inner workings of these entities may be as shown in FIG. 31 and independently, the surrounding network topology may be that of FIG. 30.

In FIG. 31, the OTT connection 3116 has been drawn abstractly to illustrate the communication between the host computer 3102 and the UE 3114 via the base station 3118 without explicit reference to any intermediary devices and the precise routing of messages via these devices. The network infrastructure may determine the routing, which may be configured to hide from the UE 3114 or from the service provider operating the host computer 3102, or both. While the OTT connection 3116 is active, the network infrastructure may further take decisions by which it dynamically changes the routing (e.g., on the basis of load balancing consideration or reconfiguration of the network).

The wireless connection 3126 between the UE 3114 and the base station 3118 is in accordance with the teachings of the embodiments described throughout this disclosure. One or more of the various embodiments improve the performance of OTT services provided to the UE 3114 using the OTT connection 3116, in which the wireless connection 3126 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 3116 between the host computer 3102 and the UE 3114, in response to variations in the measurement results. The measurement procedure and/or the network functionality for reconfiguring the OTT connection 3116 may be implemented in the software 3110 and the hardware 3104 of the host computer 3102 or in the software 3140 and the hardware 3134 of the UE 3114, or both. In some embodiments, sensors (not shown) may be deployed in or in association with communication devices through which the OTT connection 3116 passes; the sensors may participate in the measurement procedure by supplying values of the monitored quantities exemplified above, or supplying values of other physical quantities from which the software 3110, 3140 may compute or estimate the monitored quantities. The reconfiguring of the OTT connection 3116 may include message format, retransmission settings, preferred routing, etc.; the reconfiguring need not affect the base station 3118, and it may be unknown or imperceptible to the base station 3118. Such procedures and functionalities may be known and practiced in the art. In certain embodiments, measurements may involve proprietary UE signaling facilitating the host computer 3102's measurements of throughput, propagation times, latency, and the like. The measurements may be implemented in that the software 3110 and 3140 causes messages to be transmitted, in particular empty or 'dummy' messages, using the OTT connection 3116 while it monitors propagation times, errors, etc.

Figures 32, 33:
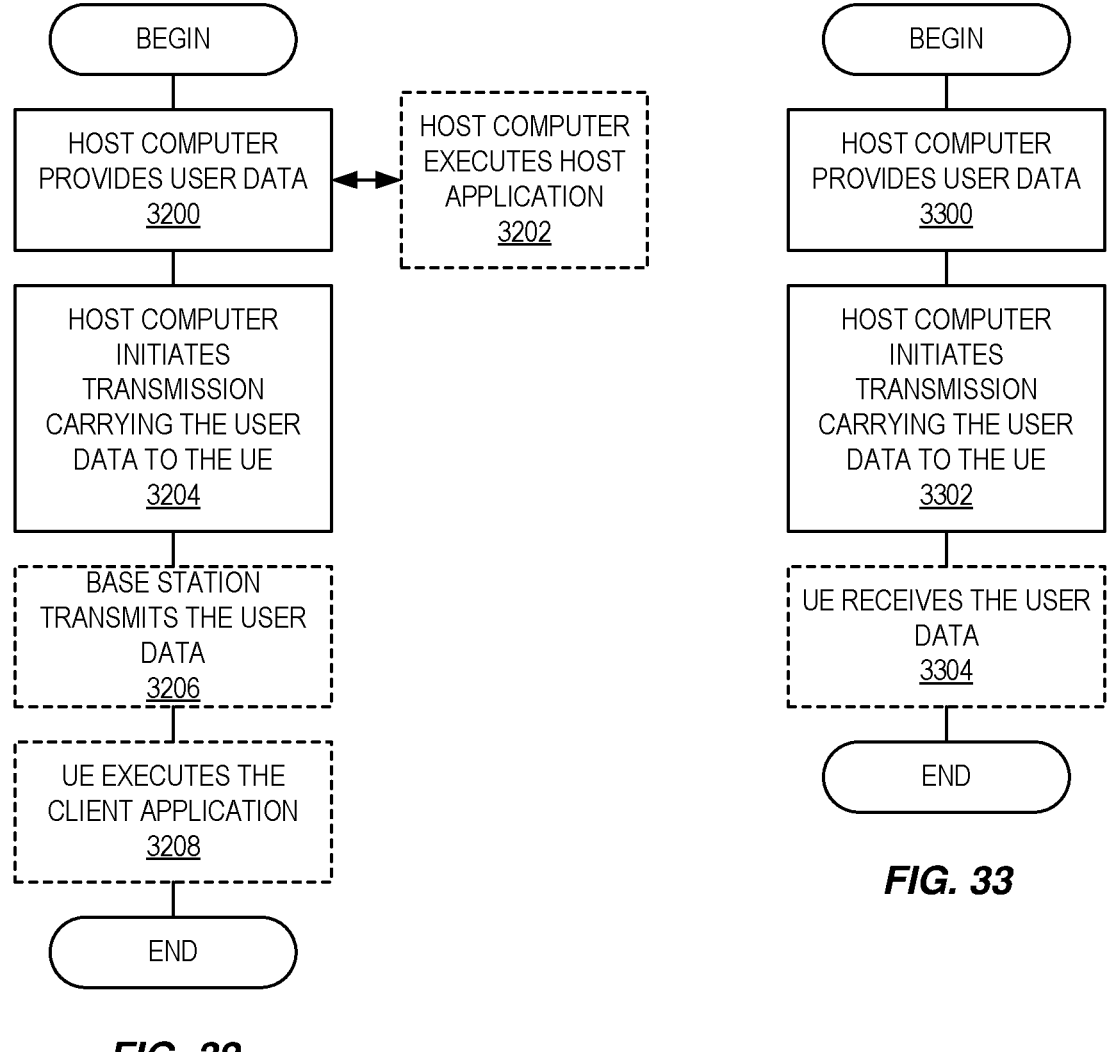
FIG. 32 is a flowchart illustrating a method implemented in a communication system, in accordance with one embodiment.
FIG. 33 is a flowchart illustrating a method implemented in a communication system, in accordance with one embodiment.

FIG. 32 is a flowchart illustrating a method implemented in a communication system, in accordance with one embodiment. The communication system includes a host computer, a base station, and a UE which may be those described with reference to FIGS. 30 and 31. For simplicity of the present disclosure, only drawing references to FIG. 32 will be included in this section. In step 3200, the host computer provides user data. In sub-step 3202 (which may be optional) of step 3200, the host computer provides the user data by executing a host application. In step 3204, the host computer initiates a transmission carrying the user data to the UE. In step 3206 (which may be optional), the base station transmits to the UE the user data which was carried in the transmission that the host computer initiated, in accordance with the teachings of the embodiments described throughout this disclosure. In step 3208 (which may also be optional), the UE executes a client application associated with the host application executed by the host computer.

FIG. 33 is a flowchart illustrating a method implemented in a communication system, in accordance with one embodiment. The communication system includes a host computer, a base station, and a UE which may be those described with reference to FIGS. 30 and 31. For simplicity of the present disclosure, only drawing references to FIG. 33 will be included in this section. In step 3300 of the method, the host computer provides user data. In an optional sub-step (not shown) the host computer provides the user data by executing a host application. In step 3302, the host computer initiates a transmission carrying the user data to the UE. The transmission may pass via the base station, in accordance with the teachings of the embodiments described throughout this disclosure. In step 3304 (which may be optional), the UE receives the user data carried in the transmission.

Figures 34, 35:
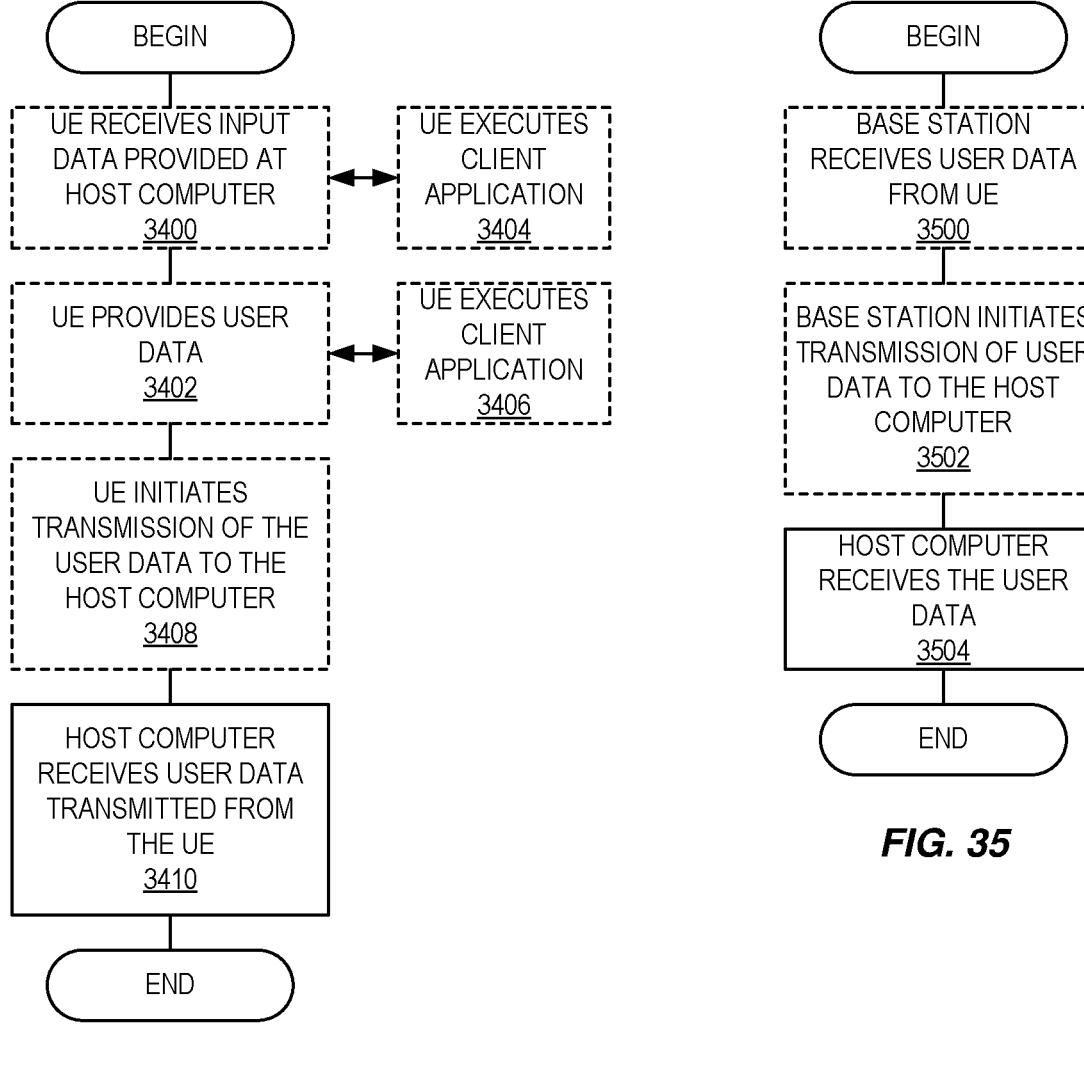
FIG. 34 is a flowchart illustrating a method implemented in a communication system, in accordance with one embodiment.
FIG. 35 is a flowchart illustrating a method implemented in a communication system, in accordance with one embodiment.

FIG. 34 is a flowchart illustrating a method implemented in a communication system, in accordance with one embodiment. The communication system includes a host computer, a base station, and a UE which may be those described with reference to FIGS. 30 and 31. For simplicity of the present disclosure, only drawing references to FIG. 34 will be included in this section. In step 3400 (which may be optional), the UE receives input data provided by the host computer. Additionally or alternatively, in step 3402, the UE provides user data. In sub-step 3404 (which may be optional) of step 3400, the UE provides the user data by executing a client application. In sub-step 3406 (which may be optional) of step 3402, the UE executes a client application which provides the user data in reaction to the received input data provided by the host computer. In providing the user data, the executed client application may further consider user input received from the user. Regardless of the specific manner in which the user data was provided, the UE initiates, in sub-step 3408 (which may be optional), transmission of the user data to the host computer. In step 3410 of the method, the host computer receives the user data transmitted from the UE, in accordance with the teachings of the embodiments described throughout this disclosure.

FIG. 35 is a flowchart illustrating a method implemented in a communication system, in accordance with one embodiment. The communication system includes a host computer, a base station, and a UE which may be those described with reference to FIGS. 30 and 31. For simplicity of the present disclosure, only drawing references to FIG. 35 will be included in this section. In step 3500 (which may be optional), in accordance with the teachings of the embodiments described throughout this disclosure, the base station receives user data from the UE. In step 3502 (which may be optional), the base station initiates transmission of the received user data to the host computer. In step 3504 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

Group A Embodiments

Embodiment 1: A method performed by a wireless device for determining Transmission Configuration Indication, TCI, states for receiving one or more Aperiodic, AP, Channel State Information Reference Signals, CSI-RSs, the method comprising one or more of: receiving (1300) one or more AP CSI-RSs in the same symbol(s) as downlink transmission(s)

scheduled by a DCI with two TCI states indicated in DCI; receiving (1302) triggering of the one or more AP CSI-RS with scheduling offset between the last symbol of the PDCCH carrying the triggering DCI and the first symbol of the AP CSI-RS resources, where the scheduling offset is smaller than a wireless device reported threshold; and determining (1304) that the downlink transmission is scheduled according to one of the group consisting of: "TDMSchemeA"; "FDMSchemeA"; "FDMSchemeB"; and a scheme where different sets of layers of the downlink transmission are received with different TCI states.

Embodiment 2: The method of any of the previous embodiments wherein the downlink transmission(s) comprises Physical Downlink Shared Channel, PDSCH, transmission(s).

Embodiment 3: The method of any of the previous embodiments wherein the wireless device reported threshold comprises a beamSwitchTiming value.

Embodiment 4: The method of any of the previous embodiments wherein PDSCH is scheduled according to one of the group consisting of: "FDMSchemeA"; "FDMSchemeB"; and a scheme where different sets of layers of the PDSCH are received with different TCI states.

Embodiment 5: The method of any of the previous embodiments wherein the scheduling offset from the last symbol of the PDCCH to the first symbol of the PDSCH is larger than or equal to the threshold timeDurationForQCL.

Embodiment 6: The method of any of the previous embodiments further comprising: when a single triggered AP CSI-RS is in the same symbols as PDSCH, applying (1306) a Quasi Co-Located, QCL, assumption given by the 1st indicated TCI state in DCI for the PDSCH when receiving the AP CSI-RS.

Embodiment 7: The method of any of the previous embodiments further comprising: when two triggered AP CSI-RSs are in the same symbols as PDSCH, applying (1306) the QCL assumption given by the $1^{st}$ and $2^{nd}$ indicated TCI states in DCI for the PDSCH when receiving the $1^{st}$ and $2^{nd}$ AP CSI-RS, respectively.

Embodiment 8: The method of any of the previous embodiments wherein the $1^{st}$ and $2^{nd}$ triggered AP CSI-RSs are according to a sorting of the corresponding CSI-RS resource identifier or a sorting of the corresponding CSI-RS resource set identifiers to which the two AP CSI-RSs belong to.

Embodiment 9: The method of any of the previous embodiments wherein the scheduling offset from the last symbol of the PDCCH to the first symbol of the PDSCH is smaller than the threshold timeDurationForQCL.

Embodiment 10: The method of any of the previous embodiments further comprising: when a single triggered AP CSI-RS is in the same symbols as PDSCH, applying (1306) the QCL assumption given by the 1st default TCI state for the PDSCH when receiving the AP CSI-RS.

Embodiment 11: The method of any of the previous embodiments further comprising: when two triggered AP CSI-RSs are in the same symbols as PDSCH, applying (1306) the QCL assumption given by the $1^{st}$ and $2^{nd}$ default TCI states for the PDSCH when receiving the $1^{st}$ and $2^{nd}$ AP CSI-RS, respectively.

Embodiment 12: The method of any of the previous embodiments wherein the $1^{st}$ and $2^{nd}$ triggered AP CSI-RSs are according to a sorting of the corresponding CSI-RS resource identifier or a sorting of the corresponding CSI-RS resource set identifiers to which the two AP CSI-RSs belong to.

Embodiment 13: The method of any of the previous embodiments wherein PDSCH is scheduled according to "TDMSchemeA".

Embodiment 14: The method of any of the previous embodiments wherein the scheduling offset from the last symbol of the PDCCH to the first symbol of the first PDSCH transmission occasion is larger than or equal to the threshold timeDurationForQCL.

Embodiment 15: The method of any of the previous embodiments further comprising: when a single triggered AP CSI-RS is in the same symbols as the first PDSCH transmission occasion, applying (1306) the QCL assumption given by the 1st indicated TCI state in DCI for the first PDSCH transmission occasion when receiving the AP CSI-RS.

Embodiment 16: The method of any of the previous embodiments further comprising: when a single triggered AP CSI-RS is in the same symbols as the second PDSCH transmission occasion, applying (1306) the QCL assumption given by the 2nd indicated TCI state in DCI for the second PDSCH transmission occasion when receiving the AP CSI-RS.

Embodiment 17: The method of any of the previous embodiments wherein the scheduling offsets from the last symbol of the PDCCH to the first symbol of the first and second PDSCH transmission occasions are both smaller than the threshold timeDurationForQCL.

Embodiment 18: The method of any of the previous embodiments further comprising: when a single triggered AP CSI-RS is in the same symbols as the first PDSCH transmission occasion, applying (1306) the QCL assumption given by the 1st default TCI state in DCI for the first PDSCH transmission occasion when receiving the AP CSI-RS.

Embodiment 19: The method of any of the previous embodiments further comprising: when a single triggered AP CSI-RS is in the same symbols as the second PDSCH transmission occasion, applying (1306) the QCL assumption given by the 2nd indicated TCI state in DCI for the second PDSCH transmission occasion when receiving the AP CSI-RS.

Embodiment 20: The method of any of the previous embodiments, further comprising: providing user data; and forwarding the user data to a host computer via the transmission to the base station.

Group B Embodiments

Embodiment 21: A method performed by a base station for indicating Transmission Configuration Indication, TCI, states for receiving one or more Aperiodic, AP, Channel State Information Reference Signals, CSI-RSs, the method comprising one or more of: transmitting (1400), to a wireless device, one or more AP CSI-RSs in the same symbol(s) as downlink transmission(s) scheduled by a DCI with two TCI states indicated in DCI; triggering (1402) one or more AP CSI-RS with scheduling offset between the last symbol of the PDCCH carrying the triggering DCI and the first symbol of the AP CSI-RS resources, where the scheduling offset is smaller than a wireless device reported threshold; and scheduling (1404) the downlink transmission according to one of the group consisting of: "TDMSchemeA"; "FDMSchemeA"; "FDMSchemeB"; and a scheme where different sets of layers of the downlink transmission are received with different TCI states.

Embodiment 22: The method of any of the previous embodiments wherein the downlink transmission(s) comprises Physical Downlink Shared Channel, PDSCH, transmission(s).

Embodiment 23: The method of any of the previous embodiments wherein the wireless device reported threshold comprises a beamSwitchTiming value.

Embodiment 24: The method of any of the previous embodiments wherein PDSCH is scheduled according to one of the group consisting of: "FDMSchemeA"; "FDMSchemeB"; and a scheme where different sets of layers of the PDSCH are received with different TCI states.

Embodiment 25: The method of any of the previous embodiments wherein the scheduling offset from the last symbol of the PDCCH to the first symbol of the PDSCH is larger than or equal to the threshold timeDurationForQCL.

Embodiment 26: The method of any of the previous embodiments further comprising: when a single triggered AP CSI-RS is in the same symbols as PDSCH, assuming (1406) the wireless device applies a Quasi Co-Located, QCL, assumption given by the 1st indicated TCI state in DCI for the PDSCH when receiving the AP CSI-RS.

Embodiment 27: The method of any of the previous embodiments further comprising: when two triggered AP CSI-RSs are in the same symbols as PDSCH, assuming (1406) the wireless device applies the QCL assumption given by the $1^{st}$ and $2^{nd}$ indicated TCI states in DCI for the PDSCH when receiving the $1^{st}$ and $2^{nd}$ AP CSI-RS, respectively.

Embodiment 28: The method of any of the previous embodiments wherein the $1^{st}$ and $2^{nd}$ triggered AP CSI-RSs are according to a sorting of the corresponding CSI-RS resource identifier or a sorting of the corresponding CSI-RS resource set identifiers to which the two AP CSI-RSs belong to.

Embodiment 29: The method of any of the previous embodiments wherein the scheduling offset from the last symbol of the PDCCH to the first symbol of the PDSCH is smaller than the threshold timeDurationForQCL.

Embodiment 30: The method of any of the previous embodiments further comprising: when a single triggered AP CSI-RS is in the same symbols as PDSCH, assuming (1406) the wireless device applies the QCL assumption given by the 1st default TCI state for the PDSCH when receiving the AP CSI-RS.

Embodiment 31: The method of any of the previous embodiments further comprising: when two triggered AP CSI-RSs are in the same symbols as PDSCH, assuming (1406) the wireless device applies the QCL assumption given by the $1^{st}$ and $2^{nd}$ default TCI states for the PDSCH when receiving the $1^{st}$ and $2^{nd}$ AP CSI-RS, respectively.

Embodiment 32: The method of any of the previous embodiments wherein the $1^{st}$ and $2^{nd}$ triggered AP CSI-RSs are according to a sorting of the corresponding CSI-RS resource identifier or a sorting of the corresponding CSI-RS resource set identifiers to which the two AP CSI-RSs belong to.

Embodiment 33: The method of any of the previous embodiments wherein PDSCH is scheduled according to "TDMSchemeA".

Embodiment 34: The method of any of the previous embodiments wherein the scheduling offset from the last symbol of the PDCCH to the first symbol of the first PDSCH transmission occasion is larger than or equal to the threshold timeDurationForQCL.

Embodiment 35: The method of any of the previous embodiments further comprising: when a single triggered AP CSI-RS is in the same symbols as the first PDSCH transmission occasion, assuming (1406) the wireless device applies the QCL assumption given by the 1st indicated TCI state in DCI for the first PDSCH transmission occasion when receiving the AP CSI-RS.

Embodiment 36: The method of any of the previous embodiments further comprising: when a single triggered AP CSI-RS is in the same symbols as the second PDSCH transmission occasion, assuming (1406) the wireless device applies the QCL assumption given by the 2nd indicated TCI state in DCI for the second PDSCH transmission occasion when receiving the AP CSI-RS.

Embodiment 37: The method of any of the previous embodiments wherein the scheduling offsets from the last symbol of the PDCCH to the first symbol of the first and second PDSCH transmission occasions are both smaller than the threshold timeDurationForQCL.

Embodiment 38: The method of any of the previous embodiments further comprising: when a single triggered AP CSI-RS is in the same symbols as the first PDSCH transmission occasion, assuming (1406) the wireless device applies the QCL assumption given by the 1st default TCI state in DCI for the first PDSCH transmission occasion when receiving the AP CSI-RS.

Embodiment 39: The method of any of the previous embodiments further comprising: when a single triggered AP CSI-RS is in the same symbols as the second PDSCH transmission occasion, assuming (1406) the wireless device applies the QCL assumption given by the 2nd indicated TCI state in DCI for the second PDSCH transmission occasion when receiving the AP CSI-RS Embodiment 40: The method of any of the previous embodiments, further comprising: obtaining user data; and forwarding the user data to a host computer or a wireless device.

Group C Embodiments

Embodiment 41: A wireless device for determining Transmission Configuration Indication, TCI, states for receiving one or more Aperiodic, AP, Channel State Information Reference Signals, CSI-RSs, the wireless device comprising: processing circuitry configured to perform any of the steps of any of the Group A embodiments; and power supply circuitry configured to supply power to the wireless device.

Embodiment 42: A base station for indicating Transmission Configuration Indication, TCI, states for receiving one or more Aperiodic, AP, Channel State Information Reference Signals, CSI-RSs, the base station comprising: processing circuitry configured to perform any of the steps of any of the Group B embodiments; and power supply circuitry configured to supply power to the base station.

Embodiment 43: A User Equipment, UE, for determining Transmission Configuration Indication, TCI, states for receiving one or more Aperiodic, AP, Channel State Information Reference Signals, CSI-RSs, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 44: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 45: The communication system of the previous embodiment further including the base station.

Embodiment 46: The communication system of the previous 2 embodiments, further including the UE, wherein the UE is configured to communicate with the base station.

Embodiment 47: The communication system of the previous 3 embodiments, wherein: the processing circuitry of the host computer is configured to execute a host application, thereby providing the user data; and the UE comprises processing circuitry configured to execute a client application associated with the host application.

Embodiment 48: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 49: The method of the previous embodiment, further comprising, at the base station, transmitting the user data.

Embodiment 50: The method of the previous 2 embodiments, wherein the user data is provided at the host computer by executing a host application, the method further comprising, at the UE, executing a client application associated with the host application.

Embodiment 51: A User Equipment, UE, configured to communicate with a base station, the UE comprising a radio interface and processing circuitry configured to perform the method of the previous 3 embodiments.

Embodiment 52: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 53: The communication system of the previous embodiment, wherein the cellular network further includes a base station configured to communicate with the UE.

Embodiment 54: The communication system of the previous 2 embodiments, wherein: the processing circuitry of the host computer is configured to execute a host application, thereby providing the user data; and the UE's processing circuitry is configured to execute a client application associated with the host application.

Embodiment 55: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 56: The method of the previous embodiment, further comprising at the UE, receiving the user data from the base station.

Embodiment 57: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 58: The communication system of the previous embodiment, further including the UE.

Embodiment 59: The communication system of the previous 2 embodiments, further including the base station, wherein the base station comprises a radio interface configured to communicate with the UE and a communication interface configured to forward to the host computer the user data carried by a transmission from the UE to the base station.

Embodiment 60: The communication system of the previous 3 embodiments, wherein: the processing circuitry of the host computer is configured to execute a host application; and the UE's processing circuitry is configured to execute a client application associated with the host application, thereby providing the user data.

Embodiment 61: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 62: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 63: The method of the previous embodiment, further comprising, at the UE, providing the user data to the base station.

Embodiment 64: The method of the previous 2 embodiments, further comprising: at the UE, executing a client application, thereby providing the user data to be transmitted; and at the host computer, executing a host application associated with the client application.

Embodiment 65: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 66: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 67: The communication system of the previous embodiment further including the base station.

Embodiment 68: The communication system of the previous 2 embodiments, further including the UE, wherein the UE is configured to communicate with the base station.

Embodiment 69: The communication system of the previous 3 embodiments, wherein: the processing circuitry of the host computer is configured to execute a host application; and the UE is configured to execute a client application associated with the host application, thereby providing the user data to be received by the host computer.

Embodiment 70: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 71: The method of the previous embodiment, further comprising at the base station, receiving the user data from the UE.

Embodiment 72: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time SCEF Service Capability Exposure Function SMF Session Management Function UDM Unified Data Management UE User Equipment UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless device for determining Transmission Configuration Indication, TCI, states for receiving one or more Aperiodic, AP, Channel State Information Reference Signals, CSI-RSs, the method comprising:

receiving downlink control information, DCI, in a physical downlink control channel, PDCCH, triggering of one or more AP CSI-RSs in one or more symbols with a first time offset between a last symbol of the PDCCH and the first symbol of the one or more symbols containing the AP CSI-RSs, where the time offset is smaller than a first threshold;

determining a Quasi Co-Location, QCL, assumption for receiving the one or more AP CSI-RSs based on a plurality of TCI states associated with one or more downlink transmissions scheduled in the same one or more symbols as the one or more AP CSI-RSs, wherein the plurality of TCI states are indicated in a DCI scheduling the one or more downlink transmissions, wherein, when the time offset is smaller than the first threshold, the determined QCL assumption is a QCL assumption given by a TCI state of the plurality of TCI states indicated by the DCI scheduling the one or more downlink transmissions in a symbol of the same one or more symbols that are used for receiving the one or more AP CSI-RSs; and receiving the one or more AP CSI-RSs in the one or more symbols using the determined QCL assumption;

wherein the determined QCL assumption is a QCL assumption given by a 1st indicated TCI state in a DCI for a Physical Downlink Shared Channel, PDSCH, in a symbol for receiving the one or more AP CSI-RSs in the same one or more symbols when the one or more downlink transmissions are one or more sets of layers of the PDSCH where each set of layers is associated with one of the plurality of TCI states; and wherein the first threshold comprises a beamSwitchTiming value reported by the wireless device.

2. The method of claim 1 wherein the one or more downlink transmissions comprise one or more Physical Downlink Shared Channel, PDSCH, transmissions.

3. The method of claim 2 wherein the one or more PDSCH transmissions are scheduled by the DCI carried in the PDCCH.

4. The method of claim 3, wherein a second time offset between a first symbol of the PDCCH carrying the DCI that schedules the one or more PDSCH and a first symbol of the PDSCH is greater than or equal to a second threshold.

5. The method of claim 1, wherein each of the one or more downlink transmissions is associated with one of the plurality of TCI states.

6. The method of claim 1, wherein the one or more downlink transmissions are one or more PDSCH repetitions in time domain or in frequency domain.

7. The method of claim 6, wherein the one or more downlink transmissions are according to one of the schemes "TDMSchemeA", "FDMSchemeB" or "FDMSchemeA".

8. The method of claim 1, wherein the one or more downlink transmissions are one or more sets of layers of a PDSCH, wherein each set of layers is associated with one of the plurality of TCI states.

9. The method of claim 1, wherein the plurality of TCI states comprises a first and a second TCI states.

10. The method of claim 1 wherein the one or more symbols are one or more Orthogonal Frequency Division Multiplexing, OFDM, symbols.

11. The method of claim 4 wherein the second threshold is a timeDurationForQCL value reported by the wireless device.

12. The method of claim 1, wherein the determined QCL assumption is a QCL assumption given by a TCI state of one or more downlink PDSCH transmissions in a symbol for receiving the one or more AP CSI-RSs in the same one or more symbols, when the one or more downlink PDSCH transmissions are one or more PDSCH repetitions in time domain and each of the one or more PDSCH transmissions is associated with one of the plurality of TCI states.

13. The method of claim 1, wherein the determined QCL assumption is a QCL assumption given by the $1^{st}$ TCI state of the plurality of TCI states for receiving the one or more AP CSI-RSs.

14. The method of claim 4 wherein a second offset is smaller than a threshold timeDurationForQCL.

15. The method of claim 1, where the plurality of TCI states comprises a first and a second default TCI states, wherein the first and second default TCI states are associated with a codepoint of a TCI field in DCI with a lowest codepoint value.

16. The method of claim 15, wherein:

a single triggered AP CSI-RS is in the same symbols as a downlink PDSCH transmission; and wherein the determined QCL assumption is a QCL assumption given by a 1st default TCI state of the PDSCH for receiving the AP CSI-RS.

17. The method of claim 14, wherein:

two triggered AP CSI-RSs are in the same symbols as a PDSCH associated with a first and a second TCI states; and the determined QCL assumption is a QCL assumption given by the $1^{st}$ and $2^{nd}$ default TCI states of the PDSCH for receiving the $1^{st}$ and $2^{nd}$ AP CSI-RS, respectively.

18. A method performed by a base station for indicating Transmission Configuration Indication, TCI, states for receiving one or more Aperiodic, AP, Channel State Information Reference Signals, CSI-RSs, the method comprising:

signaling, to a wireless device, in Downlink Control Information, DCI, in a Physical Control Channel, PDCCH, about one or more AP CSI-RSs to be transmitted to the wireless device in one or more symbols, wherein one or more downlink transmissions associated with two TCI states are also to be transmitted in the same symbols, wherein a first time offset between the PDCCH and the one or more AP CSI-RSs is smaller than or equal to a first threshold;

determining a Quasi Co-Location, QCL, assumption for transmitting the one or more AP CSI-RSs based on TCI states of the one or more downlink transmissions, wherein the plurality of TCI states are indicated in a DCI scheduling the one or more downlink transmissions, wherein, when the time offset is smaller than the first threshold, the determined QCL assumption is a QCL assumption given by a TCI state of one or more downlink transmissions in a symbol for receiving the one or more AP CSI-RSs in the same one or more symbols; and transmitting, to the wireless device, the one or more AP CSI-RSs in the one or more symbols according to the QCL assumption;

wherein the determined QCL assumption is a QCL assumption given by a $1^{st}$ indicated TCI state for a Physical Downlink Shared Channel, PDSCH, in a symbol for receiving the one or more AP CSI-RSs in the same one or more symbols when the one or more downlink transmissions are one or more sets of layers of the PDSCH where each set of layers is associated with one of the plurality of TCI states; and wherein the first threshold comprises a beamSwitchTiming value reported by the wireless device.

19. The method of claim 18, wherein the one or more downlink transmissions comprise PDSCH transmission(s).

20. A wireless device for activating Transmission Configuration Indicator, TCI, states comprising:

one or more transmitters;

one or more receivers; and processing circuitry associated with the one or more transmitters and the one or more receivers, the processing circuitry configured to cause the wireless device to:

receive downlink control information, DCI, in a physical downlink control channel, PDCCH, triggering of one or more AP CSI-RSs in one or more symbols with a scheduling offset between a last symbol of a PDCCH carrying the triggering DCI and the first symbol of the one or more symbols containing the AP CSI-RS resources, where the scheduling offset is smaller than a wireless device reported threshold; and determine a Quasi Co-Location, QCL, assumption for receiving the one or more AP CSI-RSs based on TCI states, wherein the plurality of TCI states are indicated in a DCI scheduling the one or more downlink transmissions, wherein, when the time offset is smaller than the first threshold, the determined QCL assumption is a QCL assumption given by a TCI state of the plurality of TCI states indicated by the DCI scheduling the one or more downlink transmissions in a symbol of the same one or more symbols that are used for receiving the one or more AP CSI-RSs; and receive the one or more AP CSI-RSs in the one or more symbols using the determined QCL assumption;

wherein the determined QCL assumption is a QCL assumption given by a 1st indicated TCI state in a DCI for a Physical Downlink Shared Channel, PDSCH, in a symbol for receiving the one or more AP CSI-RSs in the same one or more symbols when the one or more downlink transmissions are one or more sets of layers of the PDSCH where each set of layers is associated with one of the plurality of TCI states; and wherein the first threshold comprises a beamSwitchTiming value reported by the wireless device.

21. A base station for activating Transmission Configuration Indicator, TCI, states, comprising:

one or more transmitters;

one or more receivers; and processing circuitry associated with the one or more transmitters and the one or more receivers, the processing circuitry configured to cause the base station to:

signal, to a wireless device, in Downlink Control Information, DCI, in a Physical Control Channel, PDCCH, about one or more AP CSI-RSs to be transmitted to the wireless device in one or more symbols, wherein one or more downlink transmissions associated with two TCI states are also to be transmitted in the same symbols, wherein a first time offset between the PDCCH and the one or more AP CSI-RSs is smaller than or equal to a first threshold;

determine a Quasi Co-Location, QCL, assumption for transmitting the one or more AP CSI-RSs based on the TCI states of the one or more downlink transmissions, wherein the plurality of TCI states are indicated in a DCI scheduling the one or more downlink transmissions, wherein, when the time offset is smaller than the first threshold, the determined QCL assumption is a QCL assumption given by a TCI state of one or more downlink transmissions in a symbol for receiving the one or more AP CSI-RSs in the same one or more symbols; and transmit, to the wireless device, the one or more AP CSI-RSs in the one or more symbols according to the QCL assumption;

wherein the determined QCL assumption is a QCL assumption given by a $1^{st}$ indicated TCI state in a DCI for a Physical Downlink Shared Channel, PDSCH, in a symbol for receiving the one or more AP CSI-RSs in the same one or more symbols when the one or more downlink transmissions are one or more sets of layers of the PDSCH where each set of layers is associated with one of the plurality of TCI states; and wherein the first threshold comprises a beamSwitchTiming value reported by the wireless device.

* * * * *